(12) United States Patent
Ono et al.

(10) Patent No.: US 10,814,820 B2
(45) Date of Patent: Oct. 27, 2020

(54) AIRBAG DEVICE

(71) Applicant: TOYODA GOSEI CO., LTD., Kirosu-shi, Aichi-ken (JP)

(72) Inventors: Minoru Ono, Kiyosu (JP); Tetsuya Ogata, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 64 days.

(21) Appl. No.: 16/207,455

(22) Filed: Dec. 3, 2018

(65) Prior Publication Data
US 2019/0202392 A1 Jul. 4, 2019

(30) Foreign Application Priority Data

Dec. 28, 2017 (JP) .................... 2017-253784
Dec. 28, 2017 (JP) .................... 2017-253785

(51) Int. Cl.
| | | |
|---|---|---|
| *B60R 21/215* | (2011.01) | |
| *B60R 21/206* | (2011.01) | |
| *B60R 21/217* | (2011.01) | |
| *B60R 21/00* | (2006.01) | |
| *B60R 21/23* | (2006.01) | |
| *B60R 21/231* | (2011.01) | |

(52) U.S. Cl.
CPC .......... *B60R 21/215* (2013.01); *B60R 21/206* (2013.01); *B60R 21/217* (2013.01); *B60R 2021/0051* (2013.01); *B60R 2021/23169* (2013.01)

(58) Field of Classification Search
CPC ... B60R 21/215; B60R 21/217; B60R 21/206; B60R 2021/0051; B60R 2021/23169
See application file for complete search history.

(56) References Cited

U.S. PATENT DOCUMENTS

| | | | |
|---|---|---|---|
| 6,419,261 B1 * | 7/2002 | Ibe ................. | B60R 21/217 280/728.2 |
| 7,370,879 B2 * | 5/2008 | Hotta .............. | B60R 21/206 280/728.2 |

(Continued)

FOREIGN PATENT DOCUMENTS

| | | |
|---|---|---|
| JP | 2002-264756 A | 9/2002 |
| JP | 2008-254501 A | 10/2008 |

(Continued)

*Primary Examiner* — Drew J Brown
(74) *Attorney, Agent, or Firm* — Posz Law Group, PLC

(57) ABSTRACT

An airbag device includes an airbag, an airbag case that is made from metal and includes a base wall and a tubular wall, and an airbag cover that is made from synthetic resin and includes a covering wall and a joint wall. The case and cover are coupled together by insertion of hooks of the tubular wall of the case into joint holes of the joint wall of the cover. An approximation-limiting region suppresses the cover as coupled with the case from moving further towards the base wall of the case, and a separation-limiting region suppresses the cover as coupled with the case from moving further away from the base wall of the case. The approximation-limiting region includes an abutment region and a receiving region engageable with the abutment region. The separation-limiting region includes a retaining hole and a projection engageable with an inner surface of the retaining hole.

10 Claims, 17 Drawing Sheets

(56) References Cited

U.S. PATENT DOCUMENTS

| | | | | |
|---|---|---|---|---|
| 7,604,250 | B2* | 10/2009 | Hotta | B60R 21/206 |
| | | | | 280/728.2 |
| 10,596,991 | B2* | 3/2020 | Yamauchi | B60R 21/206 |
| 2004/0124617 | A1* | 7/2004 | Morita | B60R 21/206 |
| | | | | 280/732 |
| 2004/0245750 | A1* | 12/2004 | Takimoto | B60R 21/206 |
| | | | | 280/730.1 |
| 2005/0140123 | A1* | 6/2005 | Hotta | B60R 21/206 |
| | | | | 280/730.1 |
| 2006/0279073 | A1* | 12/2006 | Hotta | B60R 21/206 |
| | | | | 280/730.1 |
| 2008/0073885 | A1* | 3/2008 | Cowelchuk | B60R 21/205 |
| | | | | 280/728.3 |
| 2008/0238048 | A1* | 10/2008 | Ishida | B60R 21/2032 |
| | | | | 280/728.2 |

FOREIGN PATENT DOCUMENTS

| | | |
|---|---|---|
| JP | 2015-016800 A | 1/2015 |
| JP | 2015-067103 A | 4/2015 |

* cited by examiner

AIRBAG DEVICE

CROSS REFERENCE TO RELATED APPLICATIONS

The present application claims priority from Japanese Patent Application No. 2017-253784 of Ono et al. filed on Dec. 28, 2017 and Japanese Patent Application No. 2017-253785 of Ono et al. filed on Dec. 28, 2017, the entire disclosures of which are incorporated herein by reference.

BACKGROUND OF THE INVENTION

1. Field of the Invention

The present invention relates to an airbag device mountable on a vehicle. More particularly, the invention relates to an airbag device which includes a case for storing an airbag and an airbag cover which is joined with the case and includes a door openable for allowing airbag emergence when pushed by the airbag.

2. Description of Related Art

In a knee-protecting airbag device disclosed in JP 2015-067103 A, by way of example, an airbag case is made from metal and includes a base wall (or bottom wall), a tubular wall which is formed into a generally square tube and extends orthogonally to the base wall from an outer circumferential edge of the base wall, and an airbag emergence opening which is disposed opposite to the base wall and surrounded by the tubular wall. An airbag cover is fabricated of synthetic resin and includes a covering wall and a joint wall which is joined with the airbag case. The covering wall includes a door which covers the airbag emergence opening of the case and is openable when pushed by the airbag at actuation. The joint wall is formed into a generally square tube extending from a periphery of the door on a backside of the covering wall for joint with the tubular wall of the case. Coupling of the tubular wall of the case and the joint wall of the airbag cover is conducted by an insertion of a plurality of hooks formed on the tubular wall of the case into a plurality of joint holes formed on the joint wall of the airbag cover. Each of the hooks is formed into such a shape that rises outwardly from a portion in the tubular wall apart from the base wall and bends towards the base wall so as to be engageable with an inner surface of a corresponding joint hole on the side apart from the door at airbag deployment.

In order to couple the case and the airbag cover together in an assembling of the airbag device, the joint wall of the airbag cover is placed around the tubular wall of the case and moved towards the base wall of the case such that the hooks slide on an inner surface of the joint wall until the hooks reach the position of the joint holes and are fitted into the joint holes. At a point where the joint between the tubular wall of the case and joint wall of the airbag cover is thus completed, each of the hooks are not necessarily in direct engagement with the inner surface of the joint hole. The hooks have only to be brought into direct engagement with the inner surfaces of the joint holes on the side opposite to the door only at airbag deployment.

SUMMARY OF THE INVENTION

In the conventional joint structure between the case and airbag cover as described above, the greater a dimension of the joint hole is, the easier the coupling or assembling work is, but because the hooks are movable inside the joint holes, a wobbling or shakiness between the case and the airbag cover cannot be avoided while the airbag device is mounted on the vehicle. To the contrary, a size reduction of the joint holes for preventing such shakiness would make the coupling work difficult, e.g. make it necessary that the joint wall is rotated several times with respect to the tubular wall until the hooks are fitted in the joint holes, and that the joint wall is then restored to a normal orientation with respect to the tubular wall such that the hooks are positioned adequately.

It is an object of the present invention to provide an airbag device that has a simple structure and little fear of shakiness between the case and airbag cover despite the configuration that the case and the airbag cover are coupled together by insertion of hooks of the case into joint holes of the airbag cover.

In the conventional airbag device as described above, unless the airbag cover is supported by a surrounding member(s), it is possible that the door of the airbag cover and a tearable region which is formed around the door so as to help open the door slip and are dislocated from original positions with respect to the case while the airbag device is mounted on the vehicle. This may cause a faulty breakage of the tearable region and a faulty opening of the door at airbag deployment, which will of course adversely affect a deployment behavior of the airbag.

A further object of the invention is to provide an airbag device that has little fear of dislocation of a door of the airbag cover with respect to the case despite the configuration that the case and airbag cover are coupled together by insertion of hooks of the case into joint holes of the airbag cover.

The airbag device of a first invention of the present application includes an airbag in a folded-up configuration, a case for storing the airbag and an airbag cover coupled with the case. The case is made from metal and includes a base wall, a tubular wall that extends from an outer circumferential edge of the base wall, and an emergence opening that is enclosed by the tubular wall for allowing the airbag to be deployed there through. The airbag cover is made from synthetic resin and includes a covering wall that covers the emergence opening of the case, a door that is formed on the covering wall and openable when pushed by the airbag as inflated, and a joint wall that extends from a periphery of the door on a backside of the covering wall. The case further includes, in the tubular wall, a plurality of hooks each of which is formed into such a hook-like shape that rises outwardly from a position of the tubular wall apart from the base wall and extends towards the base wall. The airbag cover further includes a plurality of joint holes that are formed through the joint wall. The tubular wall of the case and the joint wall of the airbag cover are coupled together by insertion of the hooks of the case into the joint holes of the airbag cover. The airbag device of the first invention further includes an approximation-limiting region that suppresses the covering wall of the airbag cover as coupled with the case from moving further towards a direction approximating the base wall of the case, and a separation-limiting region that suppresses the covering wall of the airbag cover as coupled with the case from moving further towards a direction drawing away from the base wall of the case. The approximation-limiting region includes at least one abutment region which is disposed in either one of the case and the airbag cover, and a corresponding number of receiving region which is disposed in the other of the case and the airbag cover and abuts against the abutment region. The separation-limiting region includes at least one retaining hole which is formed in either one of the tubular wall of the case and the joint wall of the airbag cover and a corresponding number of retaining projection which is formed in the other of the tubular wall of the case and the joint wall of the airbag cover and inserted into the retaining hole for engagement with an oncoming portion of an inner surface of the retaining hole when the airbag cover moves towards the direction drawing away from the base wall.

In the airbag device according to the first invention, a coupling work of the case and airbag cover is conducted by placing the joint wall of the airbag cover around the tubular wall of the case and moving the airbag cover towards the base wall of the case such that the hooks of the case slide on an inner surface of the joint wall of the airbag cover until the hooks reach the joint holes, when the hooks are fitted into the joint holes, and the coupling work is completed. Once the case and the airbag cover are coupled together, an end surface of the abutment region of the approximation-limiting region abuts against the receiving region, such that the airbag cover no longer moves towards the base wall of the case. At the same time, the retaining projection of the separation-limiting region is fitted in the retaining hole and retains the oncoming portion of the inner surface of the retaining hole, such that the airbag cover is prevented from moving away from the base wall. That is, once coupled with the case, the airbag cover is prevented from being dislocated from the case in an approaching direction or drawing-away direction, thus the airbag cover is coupled with the case with little wobbling or shakiness. This coupling work can be simply conducted by placing the joint wall of the airbag cover around the tubular wall of the case and pushing the airbag cover towards the case until the hooks are fitted in the joint holes.

Therefore, the airbag device according to the first invention has a simple structure and little fear of shakiness between the case and airbag cover despite the configuration that the case and the airbag cover are coupled together by insertion of hooks of the case into joint holes of the airbag cover. Moreover, since the airbag cover as coupled with the case does not move towards or away from the base wall of the case while mounted on the vehicle, even if not joined with and/or supported by a surrounding member(s) of the vehicle, the airbag cover will not behave in such a manner as to protrude or dent from the surrounding member, such that an appearance of the airbag device as mounted on the vehicle and its periphery will be kept good.

In the airbag device according to the first invention, it is desired that:

the tubular wall of the case is formed into a generally square tubular contour including a pair of first opposing walls that are opposed to each other in a first direction and a pair of second opposing walls that are opposed to each other in a second direction which is orthogonal to the first direction;

the joint wall of the airbag cover is formed into a generally square tubular contour including a pair of first opposing walls that are opposed to each other in the first direction and a pair of second opposing walls that are opposed to each other in the second direction;

the approximation-limiting region is disposed on both sides of the emergence opening in or in a vicinity of either one of the first opposing walls and the second opposing walls of the case and in or in a vicinity of corresponding opposing walls of the airbag cover and the separation-limiting region is disposed on both sides of the emergence opening in the other of the first opposing walls and second opposing walls of the case and in corresponding opposing walls of the airbag cover.

With this configuration, the approximation-limiting regions are disposed on both sides of the emergence opening in one of the first direction and second direction orthogonal to the first direction while the separation-limiting regions are disposed on both sides of the emergence opening in the other of the first direction and the second direction. Therefore, the approximation-limiting regions and separation-limiting regions prevent a shakiness between the airbag cover and the case in a balanced manner around the emergence opening, in the first direction and second direction.

In the above instance, it is further desired that:

the abutment region of the approximation-limiting region is composed of a leading end region of each of the opposing walls of the joint wall of the airbag cover, the receiving region of the approximation-limiting region is disposed in the case; and the opposing walls of the joint wall of the airbag cover having the abutment regions of the approximation-limiting region are disposed outside of corresponding opposing walls of the tubular wall of the case.

With this configuration, when the airbag cover is assembled with the case by placing the joint wall of the airbag cover around the tubular wall of the case and pushing the airbag cover towards the base wall the case until the abutment regions (i.e. the leading ends of the opposing walls of the joint wall of the airbag cover) abut against the receiving regions of the case, an abutting condition is easily seen since the opposing walls of the airbag cover having the abutment regions are disposed outside of the corresponding opposing walls of the case. Accordingly, the abutting condition of the approximation-limiting regions is easily confirmed.

It is also desired that:

the retaining projection of the separation-limiting region protrudes outwardly from each of the opposing walls of the tubular wall of the case and inserted into the retaining hole disposed in each of corresponding opposing walls of the joint wall of the airbag cover; and the opposing walls of the joint wall of the airbag cover having the retaining holes are disposed outside of the opposing walls of the tubular wall of the case having the retaining projections.

With this configuration, when the airbag cover is assembled with the case by placing the joint wall of the airbag cover around the tubular wall of the case and pushing the airbag cover towards the base wall of the case until the retaining projections are fitted in the retaining holes, leading ends of the retaining projections as inserted into the retaining holes protrude outwardly and are visible since the opposing walls of the airbag cover having the retaining holes are disposed outside of the corresponding opposing walls of the case having the retaining projections. Accordingly, the coupling of the separation-limiting regions is easily confirmed.

In this instance, it is desired that the joint wall of the airbag cover has a generally rectangular annular cross-sectional contour having opposite long sides and opposite short sides, and that the retaining hole is disposed in each of the opposing walls constituting the long sides.

In order to insert the retaining projections into the retaining holes, the opposing walls of the airbag cover provided with the retaining holes are placed over the opposing walls of the case provided with the retaining projections, and the airbag cover is pushed towards the base wall of the case. At this time, the retaining projections push the inner surface of the joint wall of the airbag cover outwardly, thus the joint wall of the airbag cover bulges. However, the opposing walls of the airbag cover having the retaining holes have a greater width or length than another pair of opposing walls, thus are easy to warp. Therefore, a work for inserting the retaining projections into the retaining holes is easily conducted.

In the above instance, it is further desired that:

the joint holes are disposed in the opposing walls of the airbag cover that include the retaining holes;

the hooks are disposed in the opposing walls of the case that include the retaining projections;

the retaining hole is disposed between two of the joint holes in each of the opposing walls of the airbag cover; and a protruding amount from the opposing wall of the retaining projection is smaller than that of each of the hooks.

In the airbag device configured as described above, in order to insert the hooks of the case into the joint holes of the airbag cover, the opposing walls of the airbag cover having the joint holes are disposed over the corresponding opposing walls of the case, and then the covering wall of the airbag cover is moved towards the base wall of the case. At this time, since the protruding amount of each of the hooks is greater than that of the retaining projection and the retaining hole is disposed between the two joint holes, the hooks push the inner surfaces of the opposing walls of the airbag cover and warp and expand the same easily, and when reaching the joint holes, the hooks are fitted in the joint holes, and at the same time the retaining projections are fitted in the retaining holes and are brought into engagement with the inner surfaces of the retaining holes in the airbag cover. In other words, since the protruding amount of each of the hooks is greater than that of the retaining projection and the retaining hole is disposed between the two joint holes, while the airbag cover is moved towards the base wall of the case in order to insert the hooks into the joint holes, the retaining projections do not contact the opposing walls of the airbag cover, and when the hooks reach the joint holes, the opposing walls of the airbag cover as have been warped and expanded are restored to a flat state, and the retaining projections automatically are fitted in the retaining holes and are brought into engagement with the inner surfaces of the retaining holes. That is, the retaining projection has only to have a portion engageable with the inner surface of the retaining hole, and there is no need to consider a fear of engagement of the retaining projection with the joint wall of the airbag cover during assembling of the case and airbag cover when designing a protruding contour of the retaining projection. This provides a high degree of freedom in designing the retaining projection, thus the retaining projection can be formed into such a contour that is formed by an easy production process such as press forming.

The airbag device of a second invention of the present application includes an airbag in a folded-up configuration, a case for storing the airbag and an airbag cover coupled with the case. The case is made from metal and includes a base wall, a tubular wall that extends from an outer circumferential edge of the base wall, and an emergence opening that is enclosed by the tubular wall for allowing the airbag to be deployed there through. The joint wall of the case includes a pair of case-side opposing walls. The airbag cover is made from synthetic resin and includes a covering wall that covers the emergence opening of the case, a tearable region that is formed on the covering wall and tearable when pushed by the airbag as inflated, a door that is formed in an area surrounded by the tearable region on the covering wall and openable when the tearable region tears, and a joint wall that extends from a periphery of the door on a backside of the covering wall. The joint wall includes a pair of cover-side opposing walls each of which overlap with each of the case-side opposing walls. The case further includes, in the case-side opposing walls of the tubular wall, a plurality of hooks each of which is formed into such a hook-like shape that rises outwardly from a position of the tubular wall apart from the base wall and extends towards the base wall. The airbag cover includes, in the cover-side opposing walls of the joint wall, a corresponding number of joint holes for receiving the hooks of the case. Each of the case-side opposing walls of the case and the cover-side opposing walls of the airbag cover are coupled together by insertion of the hooks of the case into the joint holes of the airbag cover. The airbag device of the second invention further includes:

a position-limiting region that is disposed in or in a vicinity of an inner surface of at least one of the joint holes in at least one of the cover-side opposing walls of the airbag cover and that is in engagement with a corresponding one of the hooks in order to prevent a slipping movement of the hooks as inserted in the joint holes in a direction in which the hooks line up; and an insertion-permitting region that is disposed adjacent the position-limiting region and permits an insertion of the corresponding one of the hooks into the joint hole before the hook is brought into engagement with the position-limiting region.

In the airbag device according to the second invention, once the airbag cover is assembled with the case by insertion of the hooks into the joint holes, the position-limiting region is brought into engagement with the corresponding hook and prevents the airbag cover from slipping in the direction in which the hooks line up. That is, the position-limiting region prevents the cover-side opposing walls of the airbag cover as well as the door and the tearable region from slipping movement with respect to the case in the direction in which the hooks line up, such that the door and tearable region stay in a predetermined position with respect to the emergence opening. This configuration helps deploy the airbag via the emergence opening in a desired contour since the door and tearable region stay in position and the door opens steadily following a smooth breakage of the tearable region even when the door is pushed by the airbag as inflating. Moreover, although the position-limiting region is configured to arrest the corresponding hook, the hook is firstly permitted to go into the joint hole by the insertion-permitting region before brought into engagement with the position-limiting region. That is, an engagement work of the hook and the joint hole provided with the position-limiting region and insertion-permitting region does not complicate the assembling of the airbag cover and the case.

Therefore, the airbag device according to the second invention has a little fear of dislocation of the door of the airbag cover with respect to the case despite the configuration that the airbag cover and the case are coupled together by insertion of the hooks of the case into the joint holes of the airbag cover.

In the airbag device according to the second invention as described above, it is desired that the joint hole provided with the position-limiting region and the insertion-permitting region includes:

a wide portion that is greater in width in the direction in which the hooks line up than each of the hooks and constitutes the insertion-permitting region; and a narrow portion that adjoins the wide portion on a side closer to the covering wall and has an equal width in the direction in which the hooks line up to that of each of the hooks, the narrow portion constituting the position-limiting region.

With this configuration, when, in assembling of the airbag cover and case, the joint wall of the airbag cover is pushed towards the base wall of the case such that the hooks slide on the inner surfaces of the cover-side opposing wall until reaching and being inserted into the joint holes, with respect to the hook to be inserted into the joint hole provided with the position-limiting region and insertion-permitting region, the hook firstly goes into the wide portion of the joint hole and then is brought into engagement with in the narrow portion. That is, with the above configuration, the hook is easily fitted in the joint hole and is brought into engagement with the position-limiting region merely by placing the cover-side opposing walls over the case-side opposing walls and moving the airbag cover toward the base wall of the case.

In the airbag device according to the second invention, it is also desired that the position-limiting region and the insertion-permitting region are disposed in both of the cover-side opposing walls of the joint wall of the airbag cover.

With this configuration, since both of the cover-side opposing walls are each provided with the position-limiting region and the insertion-permitting region, the position-limiting regions hold the door and the tearable region of the airbag cover in position on both sides of the emergence opening, such that the door will open smoothly and steadily.

In this instance, it is desired that:
each of the cover-side opposing walls includes a cover-side abutment region; and
each of the case-side opposing walls includes a case-side abutment region that is in abutment with the cover-side abutment region; and
the cover-side abutment regions and the case-side abutment regions prevent, in combination, a slipping movement of the airbag cover with respect to the case in a direction that the cover-side opposing walls are opposed to each other.

With this configuration, the contact between the case-side abutment region and cover-side abutment region prevents the door from being dislocated in the direction that the cover-side opposing walls are opposed to each other, that is, in the direction that the case-side opposing walls are opposed to each other or in a direction orthogonal to the direction in which the hooks line up. That is, the door is prevented from being dislocated with respect to the case both in the direction in which the hooks line up and in the direction orthogonal thereto by the position-limiting region and the contact between the corresponding abutment regions of the case-side opposing walls and cover-side opposing walls. Accordingly, the door is kept in position further adequately and is able to open when pushed by the airbag such that the airbag will be deployed in a steady fashion.

In the airbag device according to the second invention, moreover, it is desired that the door of the airbag cover is configured to rotate in a direction that the cover-side opposing walls are opposed to each other when opening, in other words, it is desired that a hinge section of the door of the airbag cover about which the door opens is disposed close to one of the cover-side opposing walls provided with the joint holes.

With this configuration, even if the door opens around the hinge section with a great rotational moment following a breakage of the tearable region and pulls the joint wall of the airbag cover forcefully, the hooks as engaged with the joint holes support the joint wall adequately, thus help open the door in a steady fashion.

The door of the airbag cover in the above instance may be composed of a single door, or a double door that open towards both of the cover-side opposing walls.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
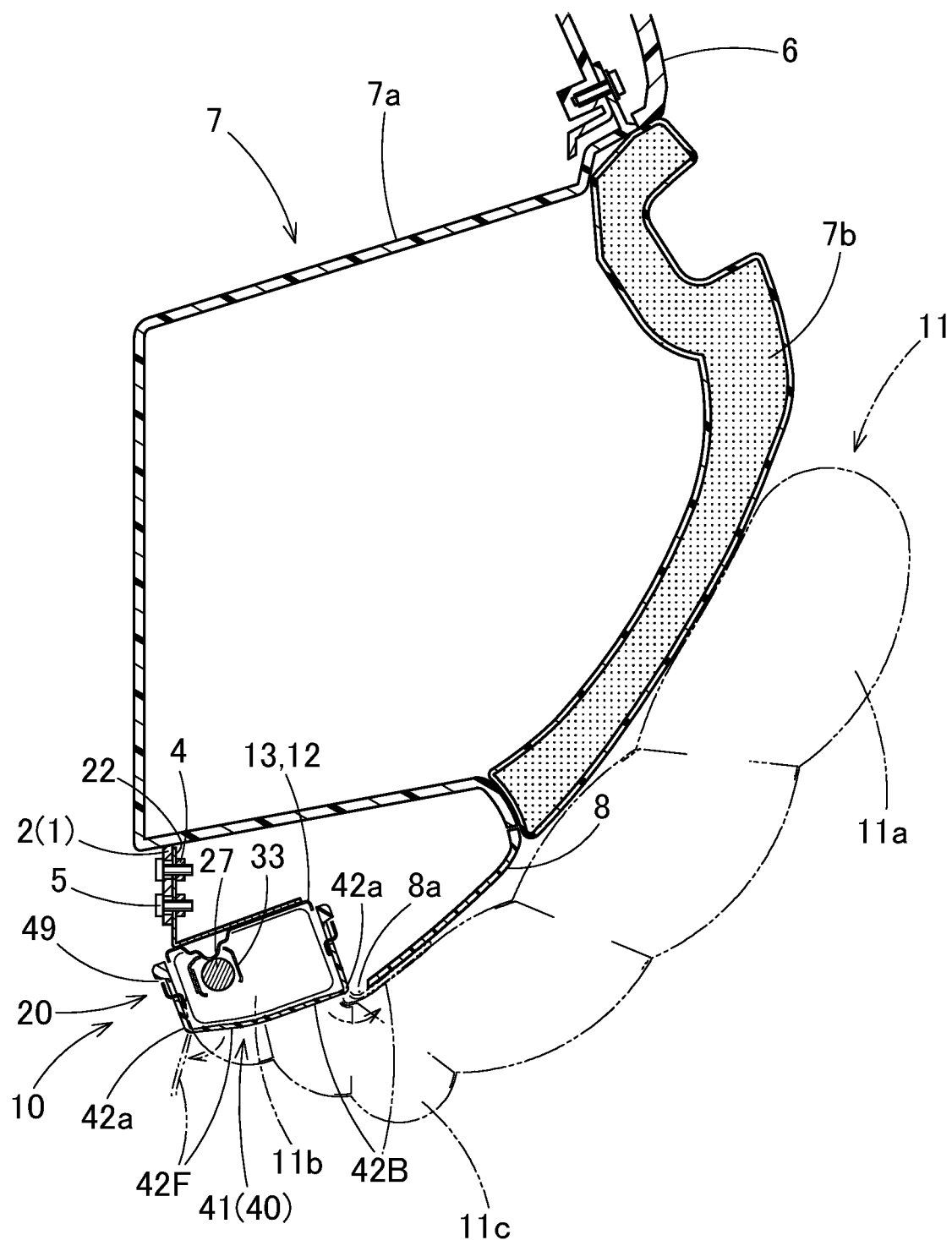
FIG. 1 is a schematic vertical sectional view of an airbag device for knee protection embodying the invention, as mounted on a vehicle.

As shown in FIG. 1, an airbag device 10 embodying the invention is adapted for knee protection. The airbag device 10 is mounted on a lower region of an instrument panel or dashboard 6 in front of a passenger seat, more particularly, beneath a glove box 7 disposed at the lower region of the dashboard 6. The glove box 7 includes a main body 7a and a lid 7b which covers the rear side of the main body 7a. The lid 7b is so openable that the upper edge is rotatable rearward. Beneath the glove box 7 is an undercover 8, and a later-described covering wall 41 of an airbag cover 40 is disposed in an opening 8a of the undercover 8. That is, the airbag device 10 is disposed at a lower area in front of the passenger seat.

Referring to FIGS. 1 to 7, the airbag device 10 includes an airbag 11 which is folded up and deployable for protecting knees of a front-seat passenger, an inflator 27 for feeding the airbag 11 with an inflation gas, a case 12 for storing and holding the airbag 11 and an airbag cover 40 which covers the airbag 11 and is coupled to the case 12.

Front-rear, up-down and left-right directions in this specification are intended to generally refer to those of the airbag device 10 as mounted on a vehicle. More specifically, as shown in FIGS. 2 to 11, the left-right direction corresponds to a length direction of a later-described base wall 13 of the case 12, and the front-rear direction corresponds to a width direction of the base wall 13. The up-down direction corresponds to a direction orthogonal to the base wall 13.

As indicated with double-dotted lines in FIG. 1, the airbag 11 is designed to push and open a later-described door 42 (42F, 42B) of the airbag cover 40, exit the case 12 and protrude upwardly and rearwardly. The airbag 11 is inflated into a generally rectangular board shape and deployed along and over the undercover 8, the lid 7a of the glove box 7 and regions of the dashboard 6 on the left and right sides of the lid 7a. The airbag 11 as fully inflated and deployed includes a lower portion 11b which protrudes downwardly from the case 12, a turning portion 11b which turns upward from the lower portion 11b, and an upper portion 11a which is deployed in front of knees of the passenger. The inflator 27 and a retainer 33 as holding the inflator 27 are disposed inside the airbag 11, and the airbag 11 is mounted on the case 12 with the aid of the retainer 33 by the lower portion 11b. The airbag 11 is internally provided with a plurality of tethers (reference numerals omitted) which connect opposing panels of the airbag 11 so as to have a J sectional contour with the turning portion 11b when deployed.

Figure 4:
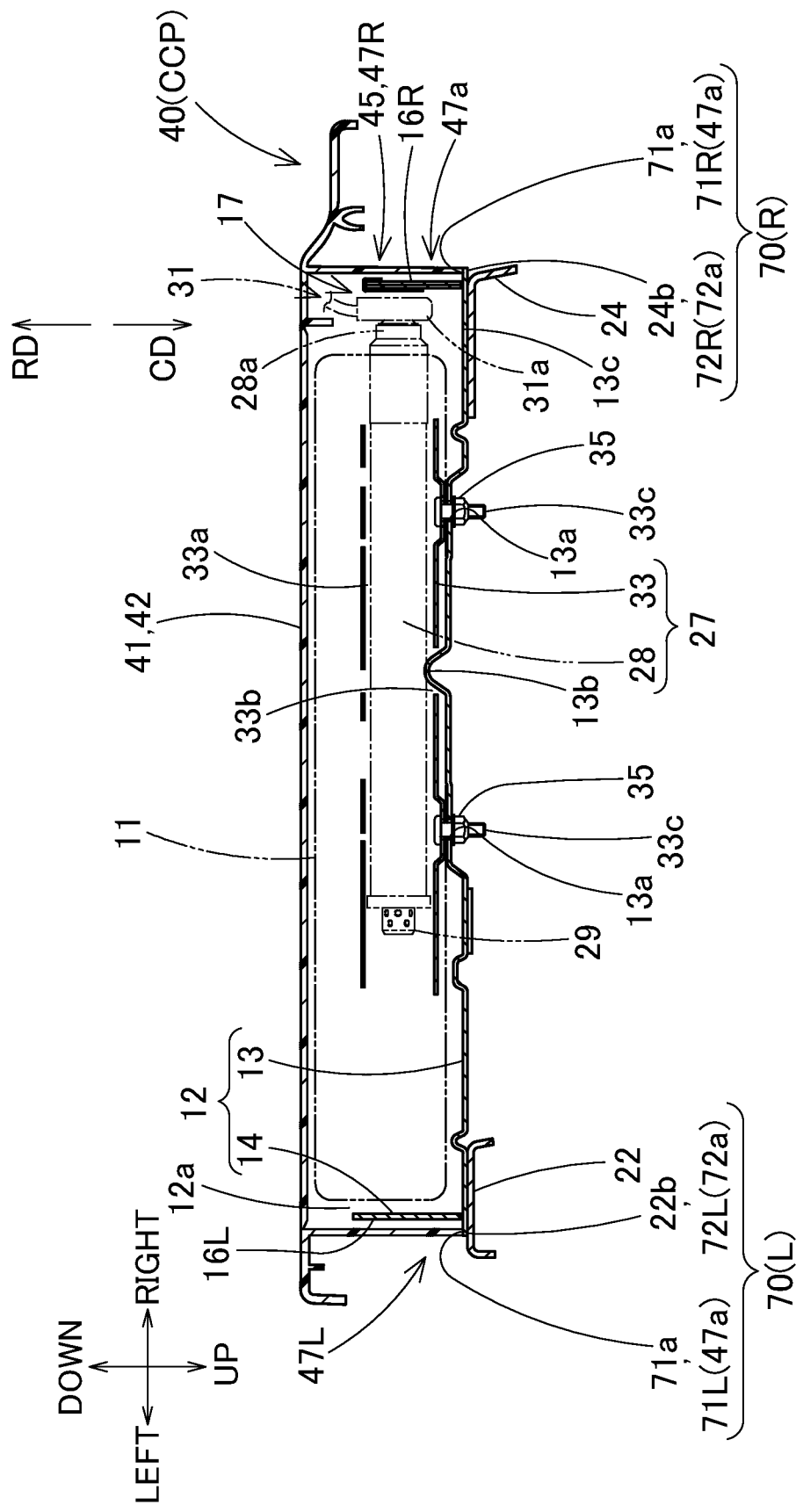
FIG. 4 is a schematic sectional view taken along line IV-IV of FIG. 2.

The inflator 27 includes a generally cylindrical body 28 and a retainer 33. The body 28 includes a gas discharging section 29 which is formed into a cylinder with a small diameter at the left end. The body 28 further includes, on the right end, a connector (connector receptacle) 28a to which a connector (connector plug) 31a of a wire harness 31 is connected for communication of an actuating signal, as shown in FIG. 4.

The retainer 33 is made from sheet metal, and includes a generally annular or hollow-cylindrical holding region 33a which holds an outer circumference of the inflator 27 and one or more bolts 33c protruding out of the holding region 33a. In the illustrated embodiment, two of the bolts 33c are provided at two spaced-apart positions in a left and right direction. Each of the bolts 33c is put through the airbag 11 and a later-described base wall 13 of the case 12, and then fastened with a nut 35 so as to mount the airbag 11 and inflator body 28 on the base wall 13 of the case 12. The holding region 33a is provided with an insert hole 33b for receiving a later-described supporting projection 13b of the base wall 13 of the case 12.

As shown in FIGS. 2 to 4, 10 and 11, the case 12 is formed of sheet metal into a generally rectangular parallelepiped, and has a base wall (or bottom wall) 13 having a rectangular plate shape and a tubular wall 14 which extends in a direction generally orthogonal to the base wall 13 (i.e. downwardly, in the illustrated embodiment) from an outer circumferential edge of the base wall 13 in a generally square tubular shape. An opening enclosed by the tubular wall 14 is an emergence opening 12a via which the airbag 11 emerges at deployment.

The base wall 13 is provided with two mounting holes 13a for receiving the bolts 33c of the inflator 33. The mounting holes 13a are disposed at a vicinity of the center in a left and right direction and at a vicinity of the right end, of the base wall 13. Between the two mounting holes 33a is a supporting projection 13b which is fitted in the insert hole 33b of the retainer 33 to abut against the outer circumference of the inflator body 28, as shown in FIG. 4. The base wall 13 further includes, at a vicinity of the right end, an extended region 13c having a trapezoidal contour. The extended region 13c is provided for securing a space for storing the connector 31a of the wire harness 31 connected to the inflator body 28.

The tubular wall 14 includes a pair of first opposing walls 15 (15F, 15B) which are opposed to each other in a front and rear direction (as a first direction DV1) and a pair of second opposing walls 16 (16L, 16R) which are opposed to each other in a left and right direction (as a second direction DV2). The first direction (i.e. the front and rear direction) DV1 and the second direction (i.e. the left and right direction) DV2 are orthogonal to each other.

Figure 3:
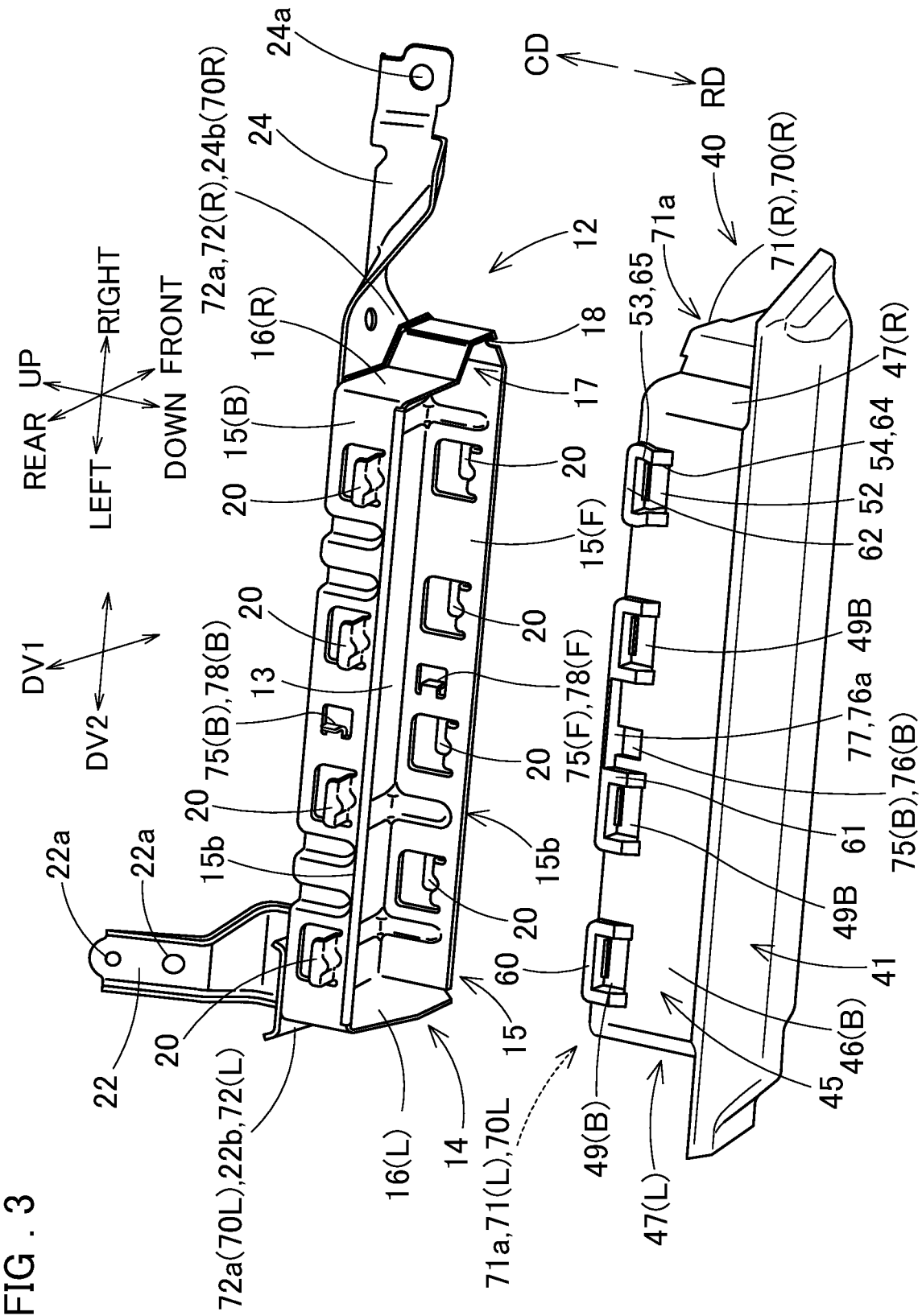
FIG. 3 shows perspective views of an airbag cover and a case of the airbag device of FIG. 1.
Figure 5:
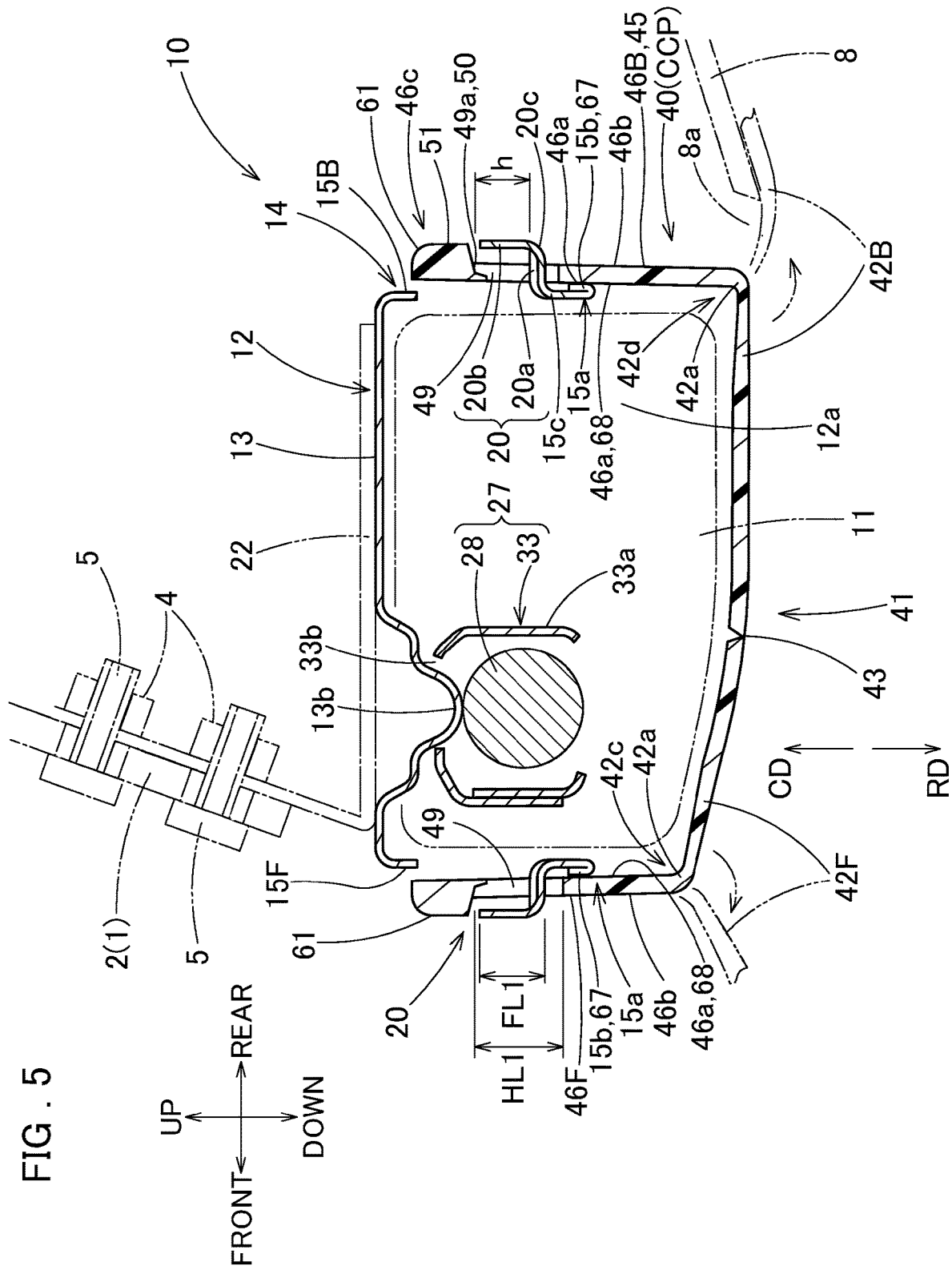
FIG. 5 is a schematic sectional view taken along line V-V of FIG. 2.

In the illustrated embodiment, as can be seen in FIGS. 3 and 5, each of the first opposing walls 15F and 15B which are opposed to each other in the front and rear direction is provided with a plurality of hooks 20 for coupling with the airbag cover 40. The hooks 20 each rise outwardly from a portion 15c of the wall 15 positioned slightly towards the base wall 13 from a leading end 15a of the wall 15 and extend towards the base wall 13, in each of the opposing wall 15F and opposing wall 15B. Four each hooks 20 are disposed along the left and right direction on the first opposing walls 15F and 15B. Each of the hooks 20 includes a rising section 20a which protrudes outwardly from the first opposing wall 15 (15F, 15B) and a pawl section 20b which bends towards the base wall 13 from the leading end of the rising section 20a. At airbag deployment, the rising section 20a is brought into abutment with an engagement region 50 or 55 of an inner surface (inner surficial region) 49a or 59a of a later-described joint hole 49 or 52, and the pawl section 20b is brought into abutment with an outer peripheral region 51 or 56 in a vicinity of the engagement region 50 or 55 of the joint hole 49 or 52, thus the hook 20 is prevented from being disengaged from the joint hole 49 or 52.

In the illustrated embodiment, each of the hooks 20 is formed by punching and bending of the sheet material of the first opposing wall 15 with press forming.

The position as the case 12 and airbag cover 40 are coupled together by insertion of the hooks 20 into the joint holes 49 and 52 and engagement of the hooks 20 with a later-described joint wall (or opposing walls 46F and 46B) 45 of the airbag cover 40 is hereinafter called a "complete coupling position CCP". As can be seen in FIG. 5 and (c) of FIG. 15, the complete coupling position CCP is such a position that a gap h exists between the rising section 20a of each of the hooks 20 and engagement region 50 or 55 of the joint wall 45 of the airbag cover 40 so as to allow the airbag cover 40 to be pushed by the airbag 11 as inflated and move downward such that the rising sections 20a of the hooks 20 are brought into abutment and engagement with the engagement regions 50 or 55 of the inner surfaces (inner surficial region) 49a or 59a of the joint holes 49 or 52 of the airbag cover 40.

Each of the first opposing walls 15F and 15B of the tubular wall 14 of the case 12 is provided, at the leading end 15a, with a thick region 15b formed by doubling the sheet metal material of the tubular wall 14 outwardly. As described later, each of the thick regions 15b serves as an abutment region 67 which is brought into abutment with a later-described abutment region 68 of an inner surface 46a of the joint wall 45 (opposing wall 46F or 46B) of the airbag cover 40 when the case 12 and airbag cover 40 are brought into the complete coupling position CCP (i.e. are assembled).

In the second opposing walls 16L and 16R of the tubular wall 14 which are opposed to each other in the left and right direction (i.e. in the second direction DV2), a right opposing wall 16R includes a bent storage region 17 for securing a space for storing the connector 31a of the wire harness 31, correspondingly to the extended region 13c of the base wall 13. The storage region 17 is provided with a retaining recess 18 for receiving the wire harness 31 in an edge in a vicinity of the opposing wall 15F, as shown in FIG. 3.

Figure 2:
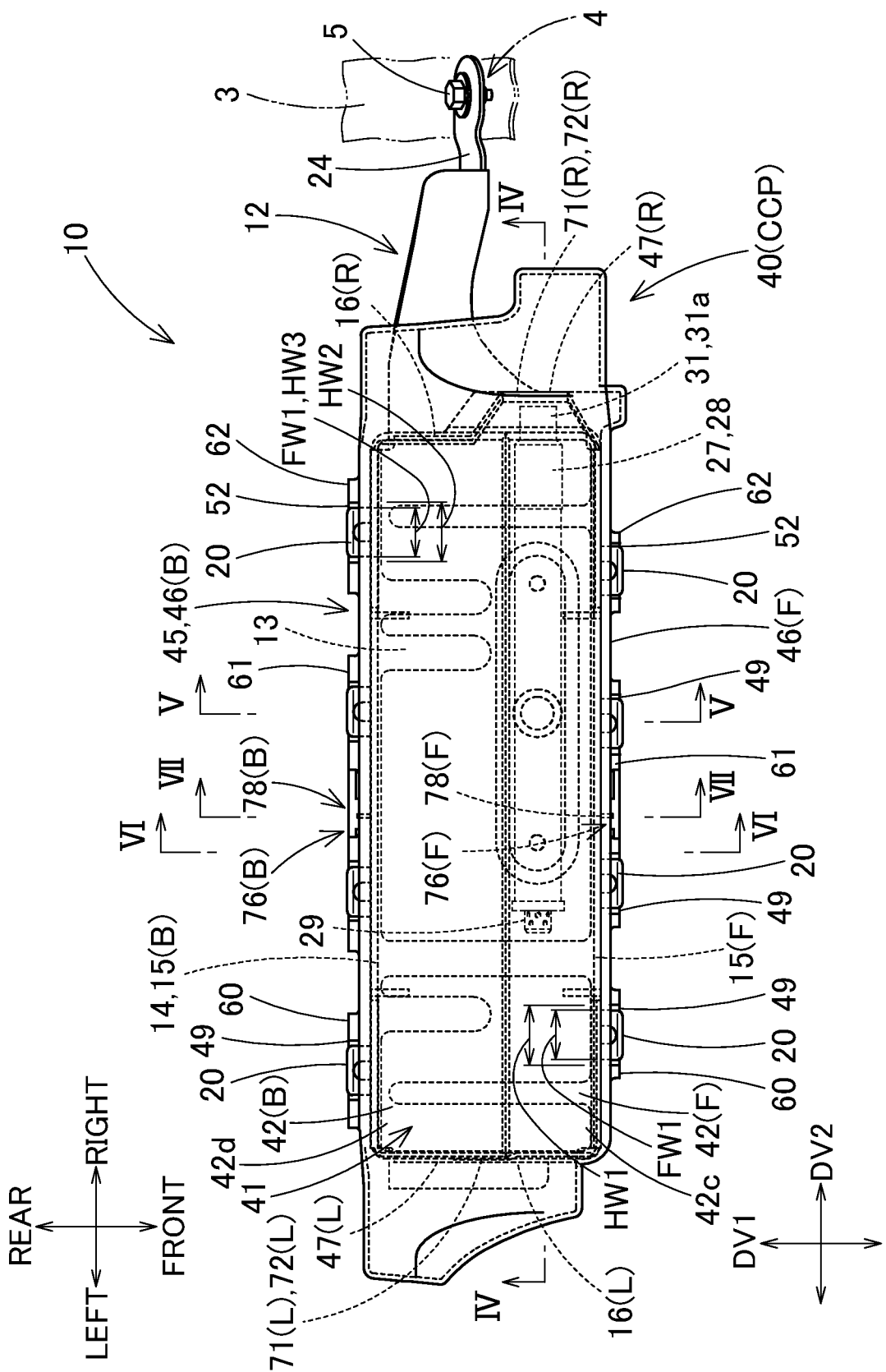
FIG. 2 is a schematic bottom view of the airbag device of FIG. 1.
Figure 10:
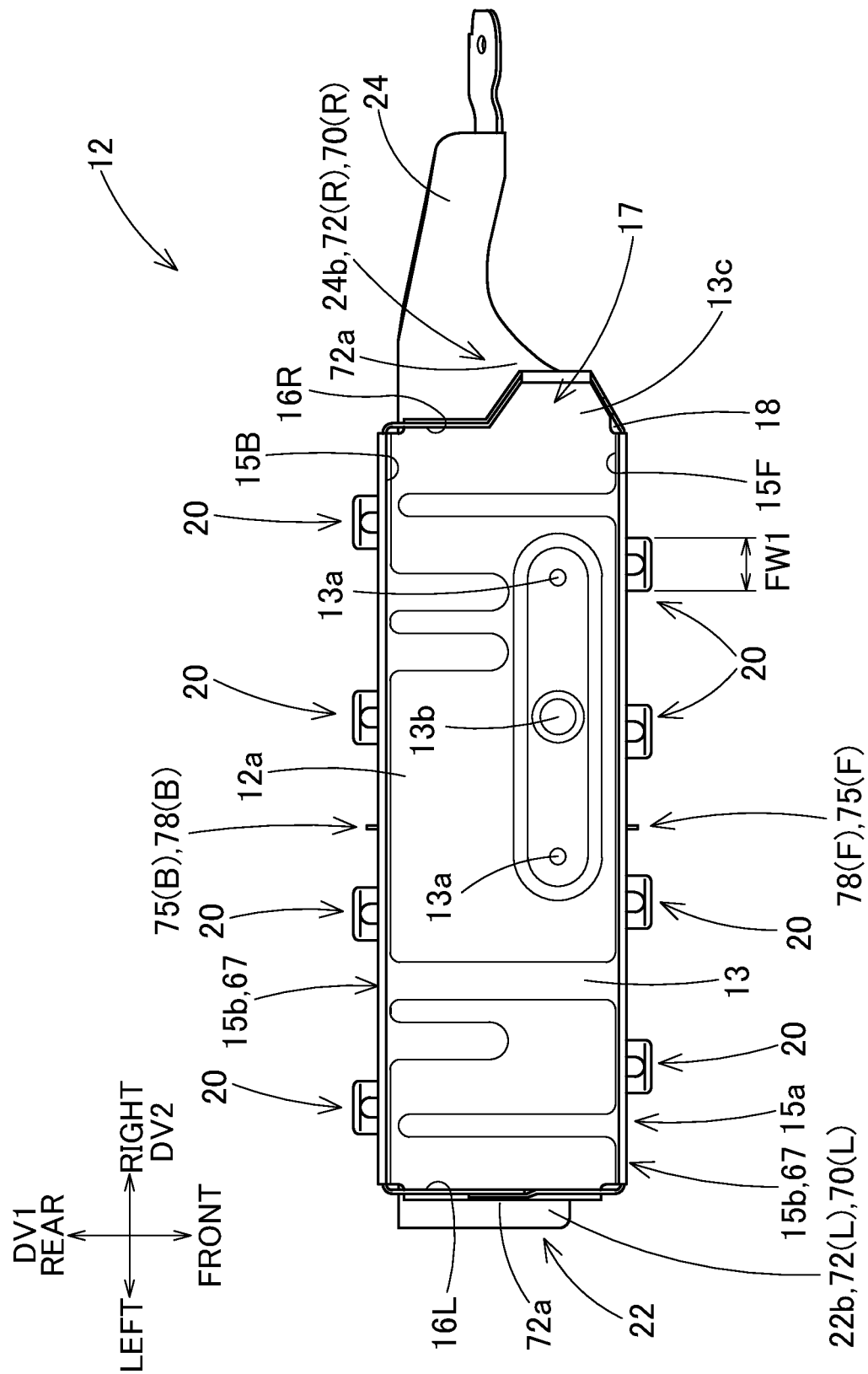
FIG. 10 is a bottom view of the case for use in the airbag device of FIG. 1.

As can be seen in FIGS. 2, 3 and 5, the case 12 further includes a mounting bracket 22 and a mounting bracket 24 which extend from the base wall 13 for mounting the airbag device 10 on the vehicle body structure 1. Each of the mounting brackets 22 and 24 is provided with a mounting hole 22a/24a for receiving a bolt 5 which is fastened with a nut 4 for securing the bracket 22/24 to a bracket 2/3 of the vehicle body structure 1. Each of the mounting brackets 22 and 24 further includes a flat-plate region 22b/24b which are disposed outside of the second opposing wall 16L/16R and extends in the second direction DV2, as can be seen in FIGS. 3, 4 and 10.

Figure 11:
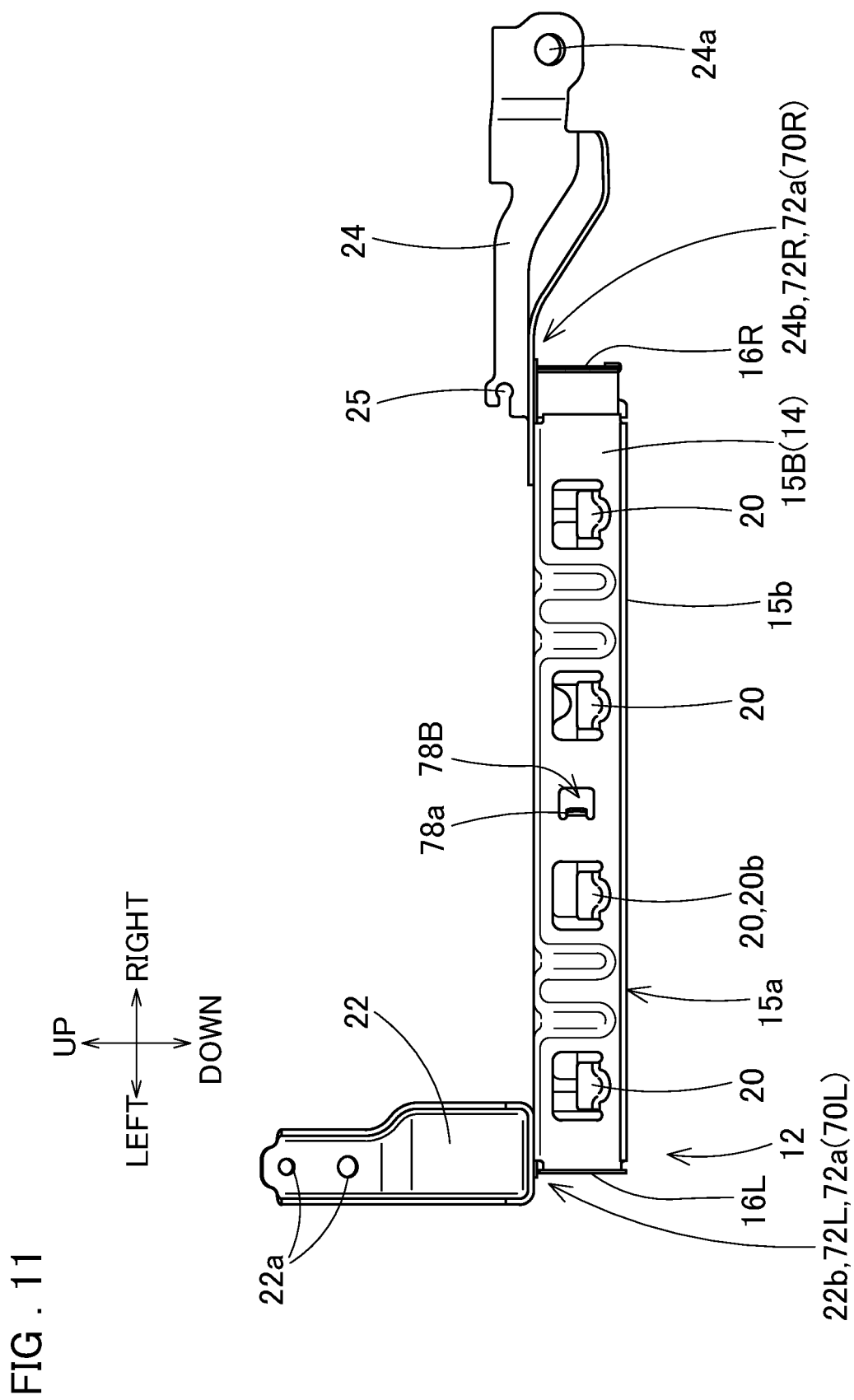
FIG. 11 is a front elevation of the case of FIG. 10.

The mounting bracket 24 formed on a side where the wire harness 31 is disposed includes a retaining recess 25 for receiving and retaining the wire harness 31, as can be seen in FIG. 11.

Referring to FIGS. 2 to 9, the airbag cover 40 is fabricated from synthetic resin such as thermoplastic elastomer of polyolefin. The airbag cover 40 includes a covering wall 41 which is formed into a generally rectangular plate shape elongated in a left and right direction and covers the emergence opening 12a of the case 12, and a joint wall 45 which is formed into a generally square tubular shape extending from the backside (or upper side) of the covering wall 41 for coupling with the case 12.

The covering wall 41 includes doors 42 (42F, 42B) which are openable forward and rearward when pushed by the airbag 11 as inflated. The doors 42 include, on the front and rear edges apart from each other, thinned hinge sections 42a about which the doors 42 open. Each of the hinge sections 42a is an integral hinge. In circumferential edges of the doors 42 except the hinge sections 42, there is disposed a thinned tearable region 43 which is configured to break when pushed by the airbag 11. In a plan view of the covering wall 41, the tearable region 43 has a H shape which has a transverse region 43a extending along a left and right direction between the doors 42F and 42B and a pair of vertical regions 43b extending in a front and rear direction from both ends of the transverse region 43a.

Figure 8:
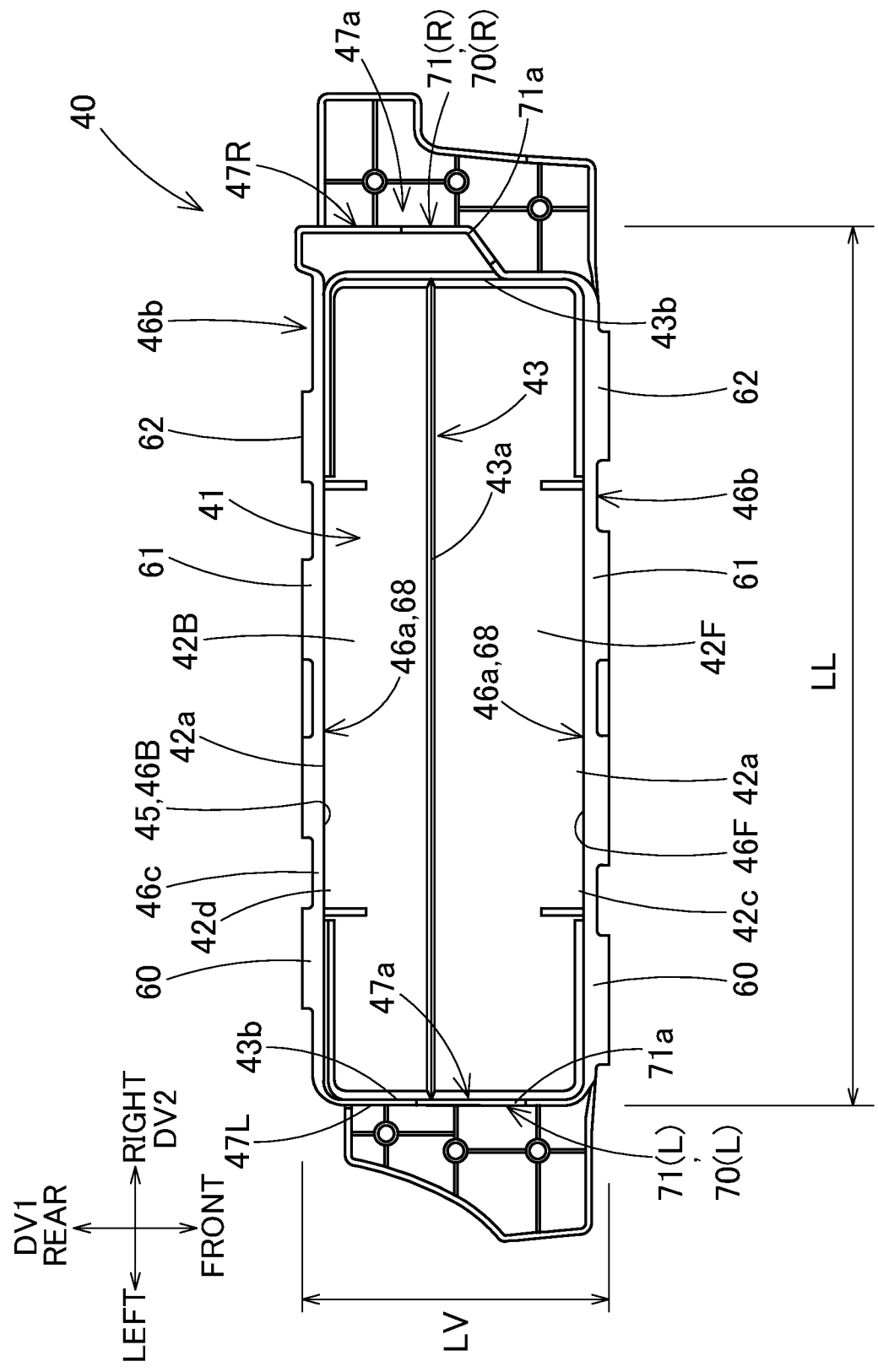
FIG. 8 is a plan view of the airbag cover for use in the airbag device of FIG. 1.

The joint wall 45 is formed into a generally square tubular shape encircling the doors 42F and 42B, and includes a pair of first opposing walls 46 (46F, 46B) which are opposed to each other in a front and rear direction (i.e. the first direction DV1) and a pair of second opposing walls 47 (47L, 47R) which are opposed to each other in a left and right direction (i.e. the second direction DV2). As can be seen in FIG. 8, the joint wall 45 of the illustrated embodiment has such a rectangular tubular shape that a length (or width) LL in the left and right direction of the first opposing walls 46 is greater than a length (or width) LV in the front and rear direction of the second opposing walls 47.

Each of the first opposing walls 46F and 46B includes three joint holes 49 and a joint hole 52 which are disposed along the left and right direction for receiving the hooks 20 of the case 12 in order for the airbag cover 40 to be coupled with the case 12. As described later, the joint hole 52, which is disposed at a vicinity of the right end of each of the first opposing walls 46F and 46B, also serves as a stopper joint hole that prevents the airbag cover 40 from slipping in the second direction (i.e. the left and right direction, or a direction in which the hooks 20 line up) DV2 with respect to the case 12, as shown in FIGS. 2, 3 and 9.

Each of the joint holes 49 and 52 has an inner surface 49a/52a. A portion of each of the inner surfaces 49a and 52a apart from the covering wall 41 serves as the engagement region 50/55 which the rising section 20a of each of the hooks 20 of the case 12 abuts against and retains when the airbag 11 is inflated. At this time, the pawl section 20b of each of the hooks 20 is brought into abutment with the peripheral region 51/56 of an outer surface 46b of the opposing wall 46F/46B in a vicinity of the engagement region 50 or 55, thus the hooks 20 are prevented from being disengaged from the joint hole 49 or 52. Then the airbag 11 as inflates pushes the doors 42F and 42B, breaks the tearable region 43 and open the doors 42F and 42B, thus protrudes out of the emergence opening 12a of the case 12.

As can be seen in FIGS. 2, 3, 5, 9 and 10, each of the joint holes 49 has such a generally rectangular shape that a width HW1 in the left and right direction is greater than a width FW1 in the left and right direction of each of the hooks 20, and that a width HL1 in the up and down direction is greater than a width FL1 in the up and down direction of each of the hooks 20.

Figure 9:
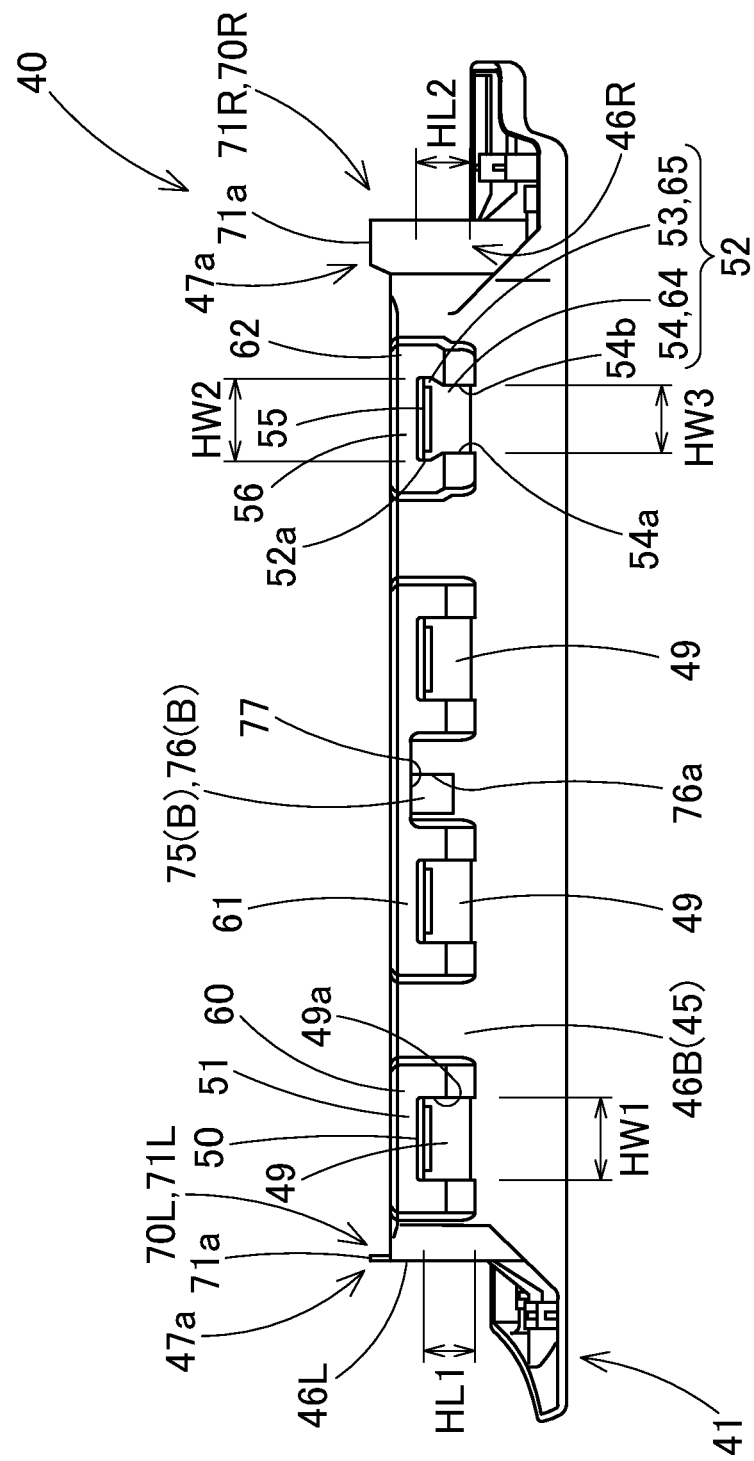
FIG. 9 is a front elevation of the airbag cover of FIG. 8.

As best shown in FIG. 9, the joint hole (i.e. stopper joint hole) 52 includes a trapezoidal wide portion 53 on an upper side apart from the covering wall 41, and a rectangular narrow portion 54 on a lower side closer to the covering wall 41, which are different from each other in width HW2, HW3 in the left and right direction. The width HW2 of the wide portion 53 is equal to the width HW1 in the left and right direction of each of the joint holes 49, i.e. greater than the width FW1 in the left and right direction of each of the hooks 20. The width HW3 of the narrow portion 54 is equal to the width FW1 in the left and right direction of each of the hooks 20. A width HL2 in the up and down direction of the joint hole 52 is equal to the width HL1 in the up and down direction of each of the joint holes 49, i.e. greater than the width FL1 in the up and down direction of each of the hooks 20. That is, the narrow portion 54 of the joint hole 52 constitutes a position-limiting region 64 that prevents the hooks 20 from slipping in the direction in which the hooks 20 line up (i.e. in the second direction DV2 or in the left and right direction) by holding left and right sides 20d of the hook 20 with the left and right inner surfaces 54a and 54b. The wide portion 53 constitutes an insertion-permitting region 65 that permits an insertion of the hook 20 with no contact between the inner surface and the hook 20.

In the peripheries of the joint holes 49 and 52 on the outer surfaces 46b of each of the first opposing walls 46F and 46B, there are disposed three ribs 60, 61 and 62 which rise from the outer surface 46b. The ribs 60, 61 and 62 are provided for preventing the pawl sections 20b of the hooks 20 from contacting fingers of the vehicle passenger or the like as the airbag device 10 is mounted on the vehicle. The rib 60 encircles an upper edge and left and right edges of the joint hole 49 disposed at the leftmost position. The rib 62 encircles an upper edge and left and right edges of the joint hole 52 disposed at the rightmost position. The rib 61 encircles an upper edge and left and right edges of each of the two joint holes 49 disposed at the center.

Figure 7:
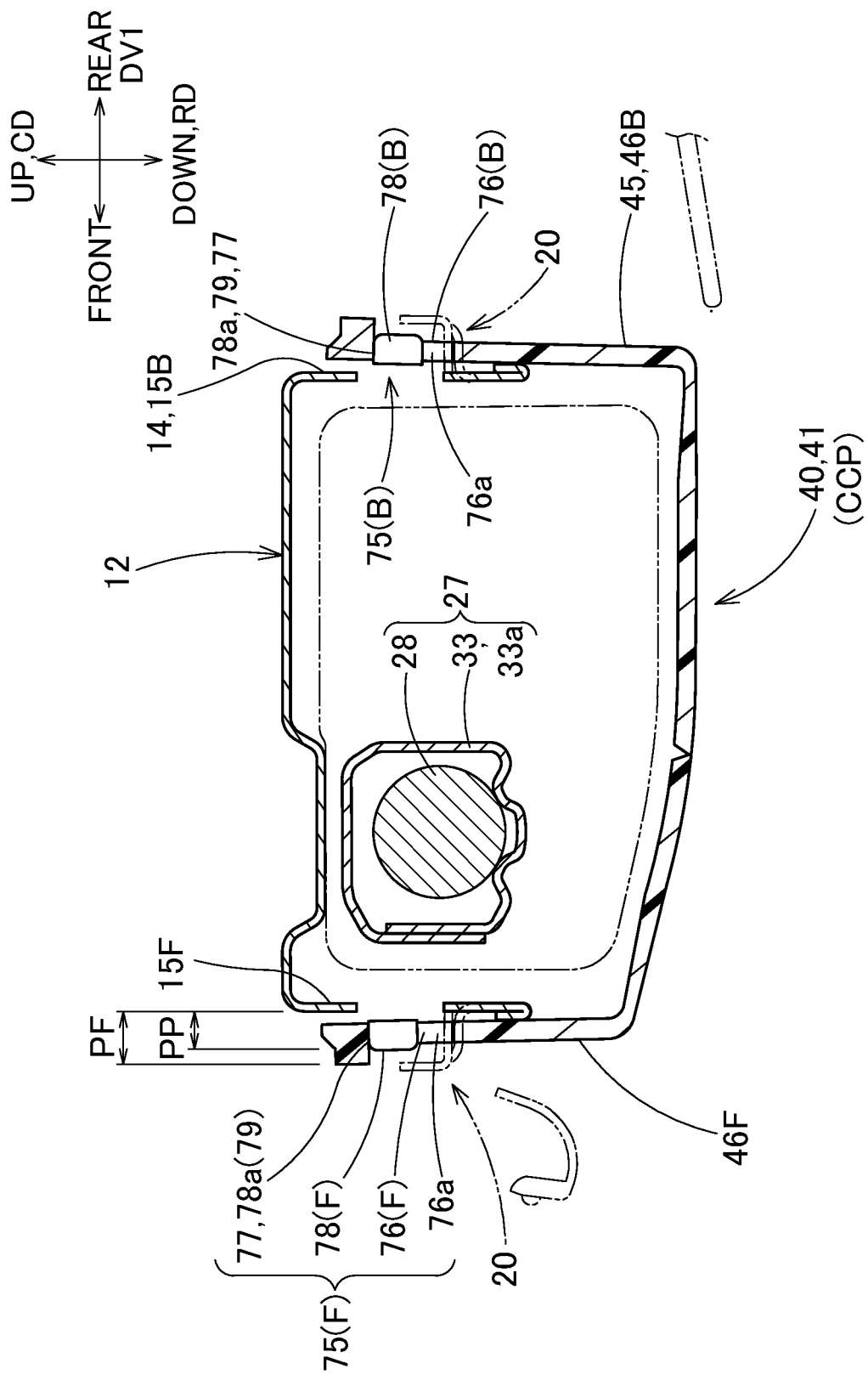
FIG. 7 is a schematic sectional view taken along line VII-VII of FIG. 2.

The airbag device 10 of the illustrated embodiment further includes a pair of separation-limiting regions 75 (75F, 75B) and a pair of approximation-limiting regions 70 (70L, 70R) that regulate movement of the airbag cover 40 as coupled with the case 12 (or as set at the complete coupling position CCP, i.e. the position as the hooks 20 of the case 12 are inserted into the joint holes 49 and 52 of the airbag cover 40) towards a separating direction RD and towards an approximating direction CD with respect to the base wall 13 of the case 12, as shown in FIGS. 4 and 7. In other words, the separation-limiting regions 75 (75F, 75B) and the approximation-limiting regions 70 (70L, 70R) each prevent the hooks 20 as fitted in the joint holes 49, 52 from moving towards or away from the base wall 13 of the case 12 inside the joint holes 49, 52.

The separation-limiting regions 75 (75F, 75B) suppress the covering wall 41 of the airbag cover 40 from moving towards the separating direction RD with respect to the base wall 13 of the case 12 as shown in FIGS. 3 and 7. Each of the separation-limiting regions 75 is composed of a retaining hole 76 which is formed in either one of the tubular wall 14 of the case 12 and the joint wall 45 of the airbag cover 40, and a retaining projection 78 which is formed in the other and inserted into the retaining hole 76 for engagement with an oncoming engagement portion 77 of an inner surface 76a of the retaining hole 76 when the airbag cover 40 moves towards the separating direction RD.

In the illustrated embodiment, as shown in FIG. 3, the retaining hole 76 of each of the separation-limiting region 75 is formed on the joint wall 45 of the airbag cover 40 and the retaining projection 78 is formed on the tubular wall 14 of the case 12, as can be seen in FIG. 3. More specifically, the retaining holes 76F and 76B are formed on the first opposing walls 46F and 46B of the airbag cover 40 which are opposed to each other in the first direction (i.e. front and rear direction) DV1, between the two joint holes 49 disposed in a vicinity of the center in the left and right direction of each of the first opposing walls 46F and 46B. Each of the retaining holes 76F and 76B is a generally rectangular opening. The retaining projections 78F and 78B are formed on the first opposing walls 15F and 15B of the case 12 which are opposed to each other in the first direction (i.e. front and rear direction) DV1. Each of the retaining projections 78F and 78B is formed into a rectangular plate protruding vertically and outwardly from the first opposing wall 15F/15B. An upper surface of each of the retaining projections 78F and 78B serves as an engagement portion 79 for abutment with the engagement portion 77 of each of the retaining holes 76F and 76B.

A protruding amount PP from the first opposing wall 15F, 15B of each of the retaining projections 78F and 78B is smaller than a protruding amount PF of each of the hooks 20.

The approximation-limiting regions 70 (70L, 70R) suppress the covering wall 41 of the airbag cover 40 from moving towards the approximating direction CD with respect to the base wall 13 of the case 12 as shown in FIGS. 3 and 4. Each of the approximation-limiting regions 70 is composed of an end surface 71a of an abutment region 71 (71L, 71R) which is formed in either one of the tubular wall 14 of the case 12 and the joint wall 45 of the airbag cover 40 and a receiving plane 72a of a receiving region 72 (72L, 72R) which is formed in the other and receives the end surface 71a of the abutment region 71.

In the illustrated embodiment, the abutment regions 71 (71L, 71R) are formed on the airbag cover 40 and the receiving regions 72 (72L, 72R) are formed on the case 12. More specifically, each of the abutment regions 71 (71L, 71R) is composed of a leading end 47a of each of the second opposing walls 47L and 47R of the joint wall 45 which are opposed to each other in the second direction (i.e. left and right direction) DV2, and each of the receiving regions 72 (72L, 72R) is disposed proximate to each of the second opposing walls 16L and 16R of the tubular wall 14 of the case 12 which are opposed to each other in the second direction (i.e. left and right direction) DV2. That is, each of the approximation-limiting regions 70 (70L, 70R) is disposed in portions of the case 12 and airbag cover 40 which are opposed to and abut against each other. The receiving regions 72 of the illustrated embodiment are composed of the flat-plate regions 22b and 24b of the mounting brackets 22 and 24 which are disposed outside in the left and right direction of the second opposing walls 16L and 16R.

Assembling of the airbag device 10 is now described. Firstly, the retainer 33 is placed inside the airbag 11 such the bolts 33c of the retainer 33 protrude out of the airbag 11. Then the airbag 11 is folded up and wrapped with a tearable wrapping member for keeping the folded-up configuration. Then the inflator body 28 as connected with the wire harness 31 is inserted into the retainer 33 via suitable openings formed in the airbag 11 and wrapping member. The airbag 11 is then stored in the tubular wall 14 of the case 12 such that the bolts 33c of the retainer 33 protrude out of the mounting holes 13a of the base wall 13 of the case 12. Subsequently, the airbag cover 40 is coupled with the case 12, and the wire harness 31 is fitted in the retaining recesses 18 and 25 formed in the case 12 and mounting bracket 24.

Figure 12:
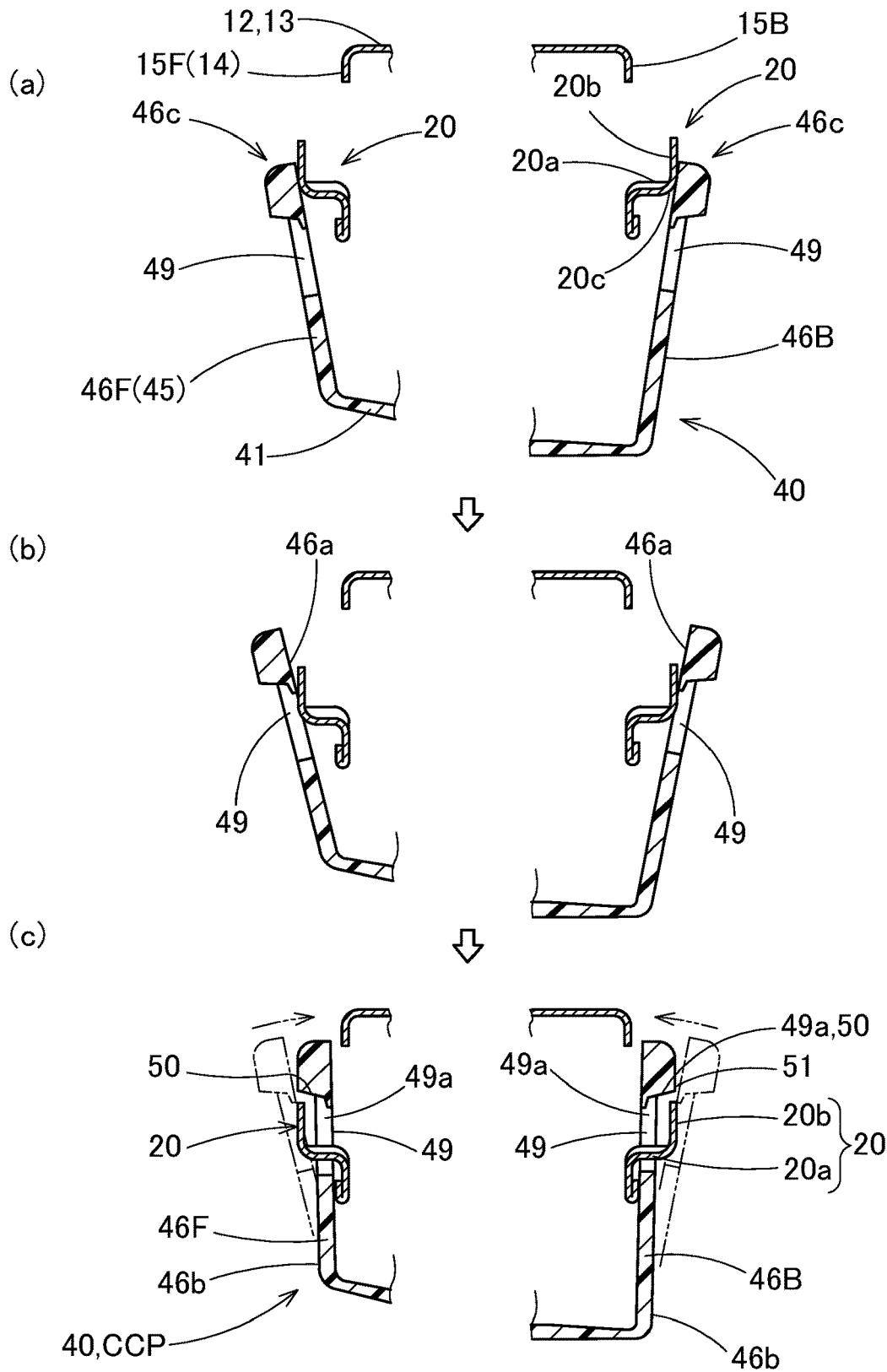
FIG. 12 illustrates the way a hook of the case is inserted into a joint hole of the airbag cover.
Figure 13:
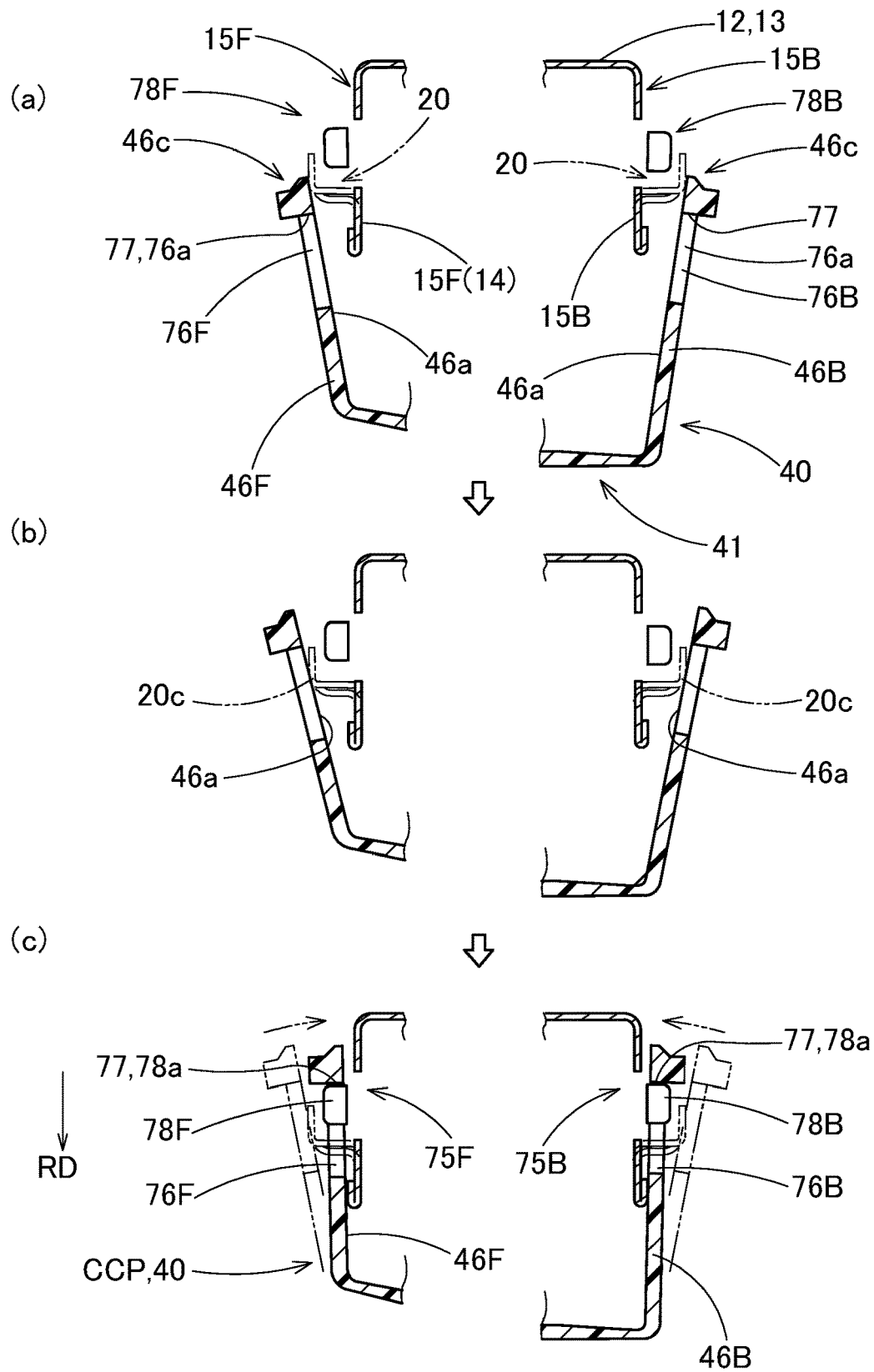
FIG. 13 illustrates the way a retaining projection of the case is inserted into a retaining hole of the airbag cover.
Figure 15:
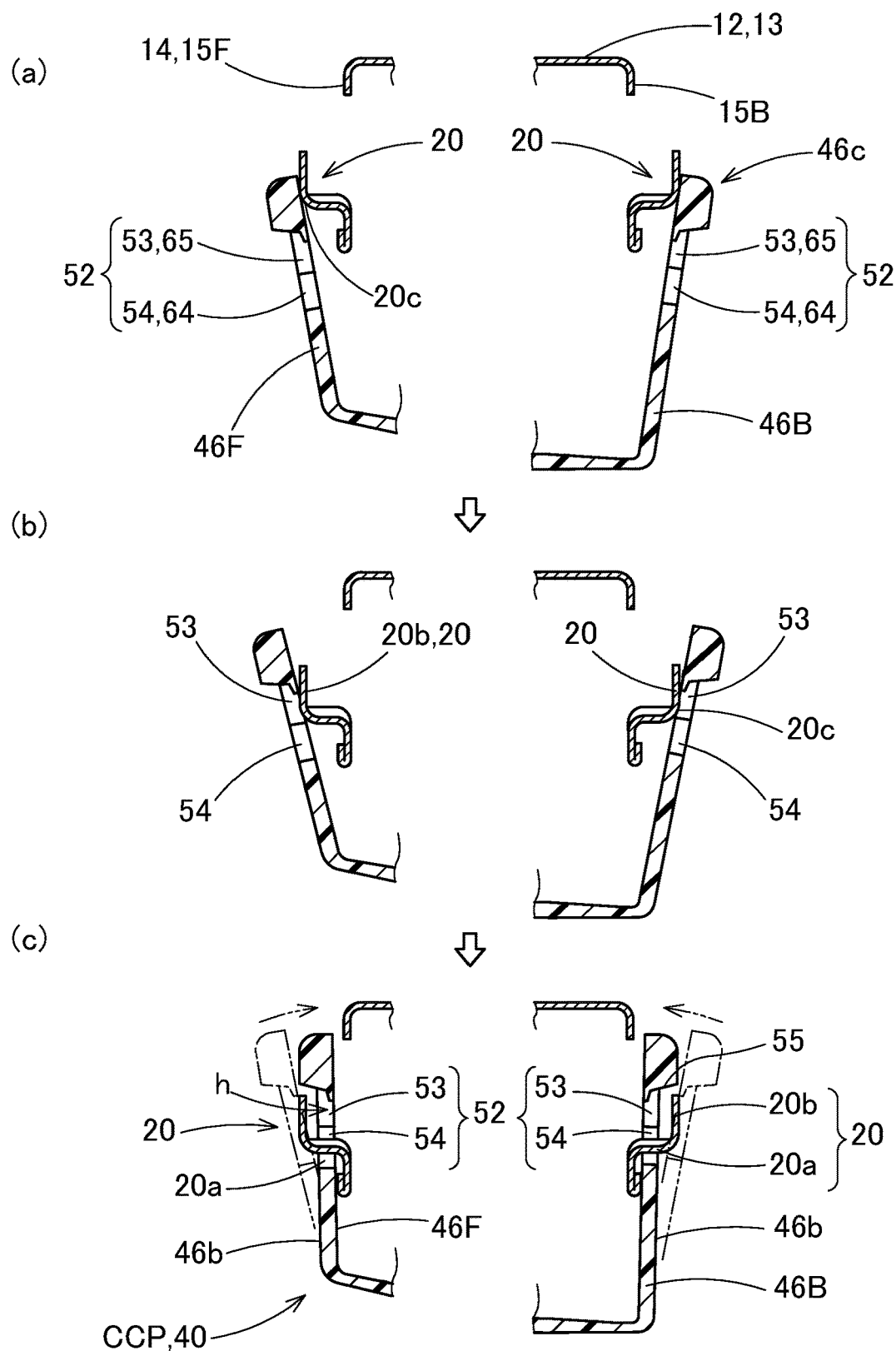
FIG. 15 illustrates the way the hook of the case is inserted into the stopper joint hole of the airbag cover in sectional views.

The coupling work of the airbag cover 40 and case 12 is conducted by placing the joint wall 45 of the airbag cover 40 around the tubular wall 14 of the case 12 such that the first opposing walls 15 and second opposing walls 16 of the case 12 each overlap with the first opposing walls 46 and second opposing walls 47 of the airbag cover 40, and pushing the airbag cover 40 towards the case 12 such that the covering wall 41 of the airbag cover 40 approximates the base wall 13 of the case 12. As shown in FIGS. 12, 13 and 15, when the opposing walls 46F and 46B of the airbag cover 40 as pushed towards the base wall 13 reach the hooks 20, leading ends 46c of the first opposing walls 46 abut against rounded intersecting regions 20c of the rising sections 20a and pawl sections 20b of the hooks 20 and separated from each other. Then when the hooks 20 slide on the inner surfaces 46a of the first opposing walls 46F and 46B and reach the joint holes 49 and 52, the hooks 20 are fitted in the joint holes 49 and 52, the rising sections 20a go through the joint holes 49 and 52, and the pawl sections 20b go through to the outer surfaces 46b of the first opposing walls 46, as can be seen in FIGS. 12 and 15. Thus the airbag cover 40 is coupled with the case 12 and set at the complete coupling position CCP.

When the airbag cover 40 is set at the complete coupling position CCP, the end surfaces 71a of the abutment regions 71 (71L, 71R) of the approximation-limiting regions 70 (70L, 70R) abut against the receiving planes 72a of the receiving regions 72 (72L, 72R), such that the covering wall 41 of the airbag cover 40 no longer moves towards the approximating direction CD, i.e. towards the base wall 13 of the case 12, as shown in FIG. 4. At the same time, as shown in FIG. 13, the retaining projections 78F and 78B are fitted in the retaining holes 76F and 76B of the separation-limiting regions 75F and 75B. With this, even if the covering wall 41 of the airbag cover 40 is moved towards the separating direction RD away from the base wall 13 of the case 12, the engagement portions 77 of the inner surfaces 76a of the retaining holes 76F and 76B abut against the engagement portions 79 of the retaining projections 78F and 78B and prevent the covering wall 41 of the airbag cover 40 from moving towards the separating direction RD away from the base wall 13 any further.

The airbag device 10 thus assembled are mounted on a predetermined position in front of the passenger seat of the vehicle by securing the mounting brackets 22 and 24 to the brackets 2 and 3 of the vehicle body structure 1 and connecting the wire harness 31 with a predetermined airbag-actuating circuit.

If the airbag device 10 as mounted on the vehicle is actuated, the inflator 27 feeds the airbag 11 with an inflation gas, the airbag 11 is inflated and push and open the doors 42F and 42B of the airbag cover 40, and is deployed as indicated with double-dotted lines in FIG. 1. When the airbag 11 is inflated and pushes the airbag cover 40 in the separating direction RD away from the base wall 13 of the case 12, it is possible that the retaining projection(s) 78 is (are) disengaged from the retaining hole(s) 76 or the retaining hole(s) 76 as engaged with the retaining projection(s) 78 is (are) expanded. However, since the hooks 20 stay in engagement with the inner surfaces of the joint holes 49 and 52 and holds the joint wall 45, the airbag 11 is able to push the doors 42F and 42B such that the tearable region 43 breaks smoothly, and be deployed via an opening formed by opening of the doors 42F and 42B.

In the airbag device 10 of the illustrated embodiment, a coupling work of the case 12 and airbag cover 40 is conducted by placing the joint wall 45 of the airbag cover 40 around the tubular wall 14 of the case 12 and moving the airbag cover 40 towards the base wall 13 of the case 12 such that the hooks 20 of the case 12 slide on the inner surface 46a of the joint wall 45 of the airbag cover 40 until the hooks 20 reach the joint holes 49 and 52, when the hooks 20 are inserted into the joint holes 49 and 52 and the coupling work is completed (i.e. the airbag cover 40 is set at the complete coupling position CCP). In this complete coupling position CCP, the end surfaces 71a of the abutment regions 71 (71L, 71R) of the approximation-limiting regions 70 (70L, 70R) abut against the receiving planes 72a of the receiving regions 72 (72L, 72R), such that the airbag cover 40 no longer moves towards the approximating direction CD, i.e. towards the base wall 13 of the case 12, as shown in FIG. 4. At the same time, as shown in (c) of FIG. 13, the retaining projections 78 (78F and 78B) of the separation-limiting regions 75 (75F and 75B) are fitted in the retaining holes 76 (76F and 76B) and retain the engagement portions 77 of the inner surfaces 76a of the retaining holes 76 (76F and 76B), such that the airbag cover 40 is prevented from moving towards the separating direction RD i.e. away from the base wall 13. That is, once set in the complete coupling position CCP, the airbag cover 40 is prevented from moving towards the approximating direction CD or separating direction RD with respect to the case 12, that is, the hooks 20 as fitted in the joint holes 49, 52 are prevented from moving towards the approximating direction CD or separating direction RD inside the joint holes 49, 52, thus the airbag cover 40 is coupled with the case 12 with little wobbling or shakiness. This coupling work can be simply conducted by placing the joint wall 45 of the airbag cover 40 around the tubular wall 14 of the case 12 and pushing the airbag cover 40 towards the case 12 until the hooks 20 are fitted in the joint holes 49 and 52 and the airbag cover 40 is set at the complete coupling position CCP.

Therefore, the airbag device 10 of the illustrated embodiment has a simple structure and little fear of shakiness or wobbling between the case 12 and the airbag cover 40, despite the configuration that the airbag cover 40 and the case 12 are coupled together by insertion of the hooks 20 of the case 12 into the joint holes 49 and 52 of the airbag cover 40. This configuration also causes little noise resulting from the shakiness.

Moreover, since the airbag cover 40 of the airbag device 10 of the illustrated embodiment does not move towards or away from the base wall 13 of the case 12 while mounted on the vehicle, even if not joined with and/or supported by a surrounding member(s) of the vehicle such as the undercover 8, the airbag cover 40 will not behave in such a manner as to protrude or dent from a periphery 8b of the opening 8a of the undercover 8, such that an appearance of the airbag device 10 as mounted on the vehicle and its periphery will be kept good.

In the airbag device 10 of the illustrated embodiment, the tubular wall 14 of the case 12 is formed into a generally square tubular contour including a pair of the first opposing walls 15 (15L, 15R) that are opposed to each other in the first direction DV1 and a pair of the second opposing walls 16 (16F, 16B) that are opposed to each other in the second direction DV2 which is orthogonal to the first direction DV1, while the joint wall 45 of the airbag cover 40 is also formed into a generally square tubular contour including a pair of the first opposing walls 46 (46F, 46B) that are opposed to each other in the first direction DV1 and a pair of the second opposing walls 47 (47F, 47B) that are opposed to each other in the second direction DV2. The abutment regions 71 (71L, 71R) and receiving regions 72 (72L, 72R) of the approximation-limiting regions 70 (70L, 70R) are disposed in or in a vicinity of the second opposing walls 16 of the case 12 which are opposed in the second direction (i.e. left and right direction) DV2 (i.e. in or in a vicinity of either one of the first opposing walls and second opposing walls of the case 12), and in corresponding opposing walls 47 of the airbag cover 40. On the other hand, as shown in FIG. 3, the retaining holes 76 (76F, 76B) and retaining projections 78 (78F, 78B) of the separation-limiting regions 75 (75F, 75B) are disposed in the first opposing walls 15 (15F, 15B) of the case 12 which are opposed in the first direction (i.e. front and rear direction) DV1 (i.e. in the other of the first opposing walls and second opposing walls of the case 12) and in corresponding opposing walls 46 (46F, 46B) of the airbag cover 40.

With this configuration, a pair of the approximation-limiting regions 70 (70L, 70R) are disposed on both sides of the emergence opening 12a in one of the first direction DV1 and second direction DV2 orthogonal to the first direction DV1 while a pair of the separation-limiting regions 75 (75F, 75B) are disposed on both sides of the emergence opening 12a in the other of the first direction DV1 and second direction DV2. Therefore, the approximation-limiting regions 70 (70L, 70R) and separation-limiting regions 75 (75F, 75B) prevent a shakiness between the airbag cover 40 and the case 12 in a balanced manner around the emergence opening 12a, in the first direction DV1 and second direction DV2.

In the illustrated embodiment, the separation-limiting regions 75 (75F, 75B) are disposed in regions of the case 12 and airbag cover 40 opposed in the first direction (i.e. front and rear direction) DV1 while the approximation-limiting regions 70 (70L, 70R) in regions of the case 12 and airbag cover 40 opposed in the second direction (i.e. left and right direction) DV2. Alternatively, the approximation-limiting regions may be disposed in regions of the case 12 and airbag cover 40 opposed in the first direction DV1 while the separation-limiting regions in regions of the case 12 and airbag cover 40 opposed in the second direction DV2.

In the airbag device 10 of the illustrated embodiment, the abutment regions 71 (71L, 71R) of the approximation-limiting regions 70 (70L, 70R) are composed of the leading ends 47a of the second opposing walls 47L and 47R of the joint wall 45, and the receiving regions 72 (72L, 72R) of the approximation-limiting regions 70 are disposed in the case 12 (specifically, in the flat-plate regions 22b and 24b of the mounting brackets 22 and 24). The second opposing walls 47L and 47R having the abutment regions 71 are disposed outside of the second opposing walls 16 (16L, 16R) of the tubular wall 14 of the case 12, as shown in FIG. 4.

With this configuration, when the airbag cover 40 is assembled with the case 12 by placing the joint wall 45 of the airbag cover 40 around the tubular wall 14 of the case 12 and pushing the airbag cover 40 towards the base wall 13 of the case 12 until the leading ends 71a of the abutment regions 71 (71L, 71R) (i.e. the leading ends 47a of the second opposing walls 47L and 47R of the joint wall 45 of the airbag cover 40) abut against the receiving planes 72a of the receiving regions 72L and 72R of the case 12, an abutting condition is easily seen since the second opposing walls 47L and 47R having the abutment regions 71L and 71R are disposed outside of the corresponding opposing walls 16L and 16R of the case 12. Accordingly, the abutting condition of the approximation-limiting regions is easily confirmed.

If such an advantageous effect does not have to be considered, it would also be conceivable to locate the abutment region of the approximation-limiting regions at the leading end of each of the opposing walls 16 (16L, 16R) of the case 12 while locating corresponding receiving regions in the covering wall 41 of the airbag cover 40.

In the airbag device 10 of the illustrated embodiment, as shown in FIG. 13, the retaining projection 78 (78F, 78B) of the separation-limiting region 75 (75F, 75B) protrudes outwardly from each of the first opposing walls 15 (15F, 15B) of the tubular wall 14 of the case 12 and inserted into the retaining hole 76 (76F, 76B) disposed in each of corresponding opposing walls 46 (46F, 46B) of the joint wall 45 of the airbag cover 40. The opposing walls 46 (46F, 46B) of the airbag cover 40 having the retaining holes 76 (76F, 76B) are disposed outside of the opposing walls 15 (15F, 15B) of the case 12 having the retaining projections 78 (78F, 78B).

With this configuration, when the airbag cover 40 is assembled with the case 12 by placing the joint wall 45 of the airbag cover 40 around the tubular wall 14 of the case 12 and pushing the airbag cover 40 towards the base wall 13 of the case 12 until the retaining projections 78 (78F, 78B) are fitted into the retaining holes 76 (76F, 76B), leading ends of the retaining projections 78 (78F, 78B) as inserted into the retaining holes 76 (76F, 76B) protrude outwardly and are visible since the opposing walls 46 (46F, 46B) of the airbag cover 40 having the retaining holes 76 (76F, 76B) are disposed outside of the corresponding opposing walls 15 (15F, 15B) of the case 12 having the retaining projections 78. Accordingly, the coupling of the separation-limiting regions 75 (75L, 75R) is easily confirmed.

If such an advantageous effect does not have to be considered, it would also be conceivable to locate the retaining projections of the separation-limiting regions in the joint wall 45 of the airbag cover 40 while locating corresponding retaining holes in the tubular wall 14 of the case 12.

In the airbag device 10 of the illustrated embodiment, moreover, the joint wall 45 of the airbag cover 40 has a generally rectangular annular cross-sectional contour having opposite long sides and opposite short sides, and the retaining holes 76 (76F, 76B) are disposed in the first opposing walls 46F and 46B constituting the long sides. The retaining projections 78 (78F, 78B) are disposed in the corresponding opposing walls 15F and 15B of the tubular wall 14 of the case 12.

In the foregoing embodiment, in order to insert the retaining projections 78 (78F, 78B) into the retaining holes 76 (76F, 76B), the first opposing walls 46F and 46B of the airbag cover 40 provided with the retaining holes 76 are placed over the first opposing walls 15F and 15B of the case 12 provided with the retaining projections 78, and the airbag cover 40 is pushed towards the base wall 13 of the case 12. At this time, the joint wall 45 of the airbag cover 40 is pushed by leading ends of the retaining projections 78, as well as by the hooks 20, in the illustrated embodiment, on the inner surface 46a, thus bulges, as can be seen in FIGS. 12 and 15. The first opposing walls 46F and 46B of the joint wall 45 of the airbag cover 40 having the retaining holes 76 (76F, 76B), however, have the width (or length) LL greater than the second opposing walls 47 (47L, 47R) with the width (or length) LV as shown in FIG. 8, thus are easy to warp. Accordingly, a work for inserting the retaining projections 78 (78F, 78B) into the retaining holes 76 (76F, 76B) is easily conducted.

If such an advantageous effect does not have to be considered, the separation-limiting region may be disposed on the second opposing walls 16 (16L, 16R) and 47 (47L, 47R) of the case 12 and airbag cover 40.

In the airbag device 10 of the illustrated embodiment, the joint holes 49 and 52 are disposed in the first opposing walls 46 (46F, 46B) of the airbag cover 40 that have the retaining holes 76 (76F, 76B), and the hooks 20 engageable with the joint holes 49 and 52 are disposed in the first opposing walls 15 (15F, 15B) of the case 12 that have the retaining projections 78 (78F, 78B). The retaining hole 76 (76F, 76B) is disposed between two of the joint holes 49 in each of the opposing walls 46 of the airbag cover 40. The protruding amount PP from the opposing wall 15 of each of the retaining projections 78 is smaller than the protruding amount PF of each of the hooks 20.

As shown in FIGS. 12, 13 and 15, in order to insert the hooks 20 of the case 12 into the joint holes 49 and 52 of the airbag cover 40, the first opposing walls 46 of the airbag cover 40 having the joint holes 49 and 52 are disposed over the first opposing walls 15 of the case 12 having the hooks 20, and then the covering wall 41 of the airbag cover 40 is moved towards the base wall 13 of the case 12. At this time, since the protruding amount PF of each of the hooks 20 is greater than the protruding amount PP of each of the retaining projections 78 and the retaining hole 76 is disposed between two of the joint holes 49, the hooks 20 push up the inner surfaces 46a of the first opposing walls 46 of the airbag cover 40 and warp and expand the same easily, and when reaching the joint holes 49 and 52, the hooks 20 are fitted in the joint holes 49 and 52, and at the same time the retaining projections 78 are fitted in the retaining holes 76 and are brought into engagement with the engagement portions 77 of the inner surfaces 76a of the retaining holes 76 in the airbag cover 40. In other words, since the protruding amount PF of each of the hooks 20 is greater than the protruding amount PP of each of the retaining projections 78 and the retaining hole 76 is disposed between the two joint holes 49, while the airbag cover 40 is moved towards the base wall 13 of the case 12 in order to insert the hooks 20 into the joint holes 49 and 52, the retaining projections 78 do not contact the opposing walls 46, and when the hooks 20 reach the joint holes 49 and 52, the opposing walls 46 of the airbag cover 40 as have been warped and expanded are restored to a flat state, and the retaining projections 78 are automatically fitted in the retaining holes 76 and are brought into engagement with the engagement portions 77 of the inner surfaces 76a of the retaining holes 76. That is, the retaining projection 78 has only to have the engagement portion 79, and there is no need to consider a fear of engagement of the retaining projection 78 with the joint wall 45 of the airbag cover 40 during the assembling of the case 12 and airbag cover 40 when designing a protruding contour of the retaining projection 78. This provides a high degree of freedom in designing the retaining projection, thus the retaining projection can be formed into such a contour that is formed by an easy production process such as press forming. The retaining projections 78 of the illustrated embodiment are simply formed by cutting and raising the sheet metal material of the case 12 into a generally rectangular plate shape protruding vertically from the tubular wall 14 of the case 12.

Figure 14:
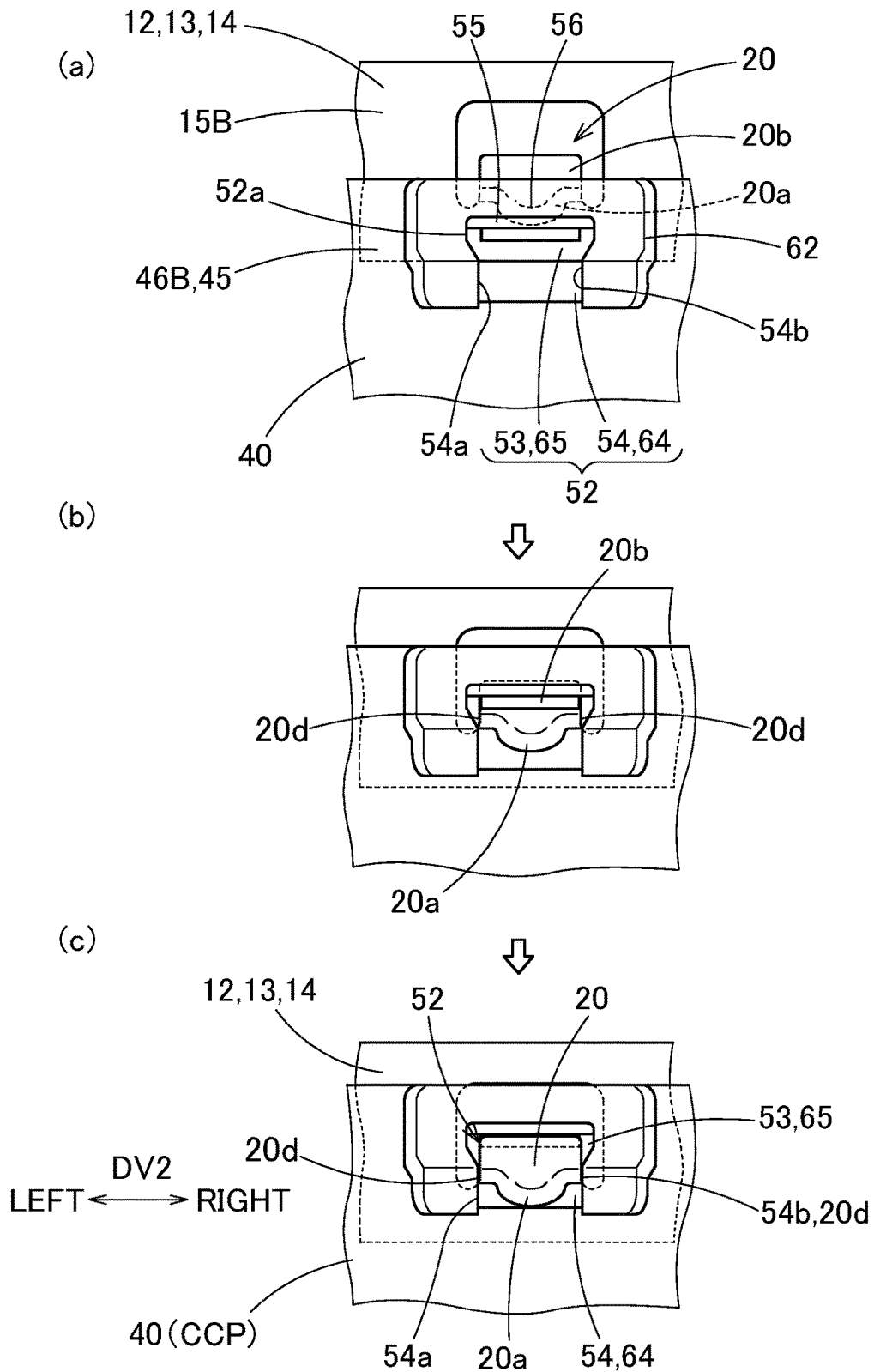
FIG. 14 illustrates the way the hook of the case is inserted into a stopper joint hole having a wide portion and a narrow portion in the airbag cover, as viewed from the front.

In the airbag device 10 of the illustrated embodiment, as shown in FIG. 14, once the airbag cover 40 is assembled with the case 12 by insertion of the hooks 20 into the joint holes 45, the inner surfaces 54a and 54b of the narrow portion 54 (i.e. the position-limiting region 64) abut against the left and right sides 20d of a corresponding one of the hooks 20 and prevent the airbag cover 40 from slipping in the direction in which the hooks 20 line up (i.e. in the second direction DV2 or in the left and right direction). That is, the position-limiting regions 64 prevent the first opposing walls 46F and 46B of the airbag cover 40 as well as the doors 42 and tearable region 43 from slipping movement with respect to the case 12 in the second direction DV2 in which the hooks 20 line up, such that the doors 42 and tearable region 43 stay in a predetermined position with respect to the emergence opening 12a. This configuration helps deploy the airbag 11 via the emergence opening 12a in a desired contour since the doors 42 and tearable region 43 stay in position and the doors 42 open steadily following a smooth breakage of the tearable region 43 even when the doors 42 are pushed by the airbag 11 as inflating. Moreover, although the position-limiting region 64 is configured to arrest the corresponding hook 20 on the left and right sides 20d (i.e. the sides in the direction DV2 in which the hooks 20 line up) by the left and right inner surfaces 54a and 54b, the hook 20 firstly goes through the insertion-permitting region 65 with a greater width before brought into engagement with the position-limiting region 64. That is, an engagement work of the corresponding hook 20 and the joint hole (stopper joint hole) 52 provided with the position-limiting region 64 and insertion-permitting region 65 does not complicate the assembling of the airbag cover 40 and the case 12.

Therefore, the airbag device 10 of the illustrated embodiment has little fear of dislocation of the door 42 (42F, 42B) of the airbag cover 40 with respect to the case 12, with a simple joint structure between the airbag cover 40 and the case 12.

In the airbag device 10 of the illustrated embodiment, the stopper joint hole 52 includes the wide portion 53 which has the width HW2 in the direction DV2 (i.e. the direction in which the hooks 20 line up) greater than the width FW1 of the hook 20 inserted into the joint hole 52, and the wide portion 53 constitutes the insertion-permitting region 65. The stopper joint hole 52 also includes the narrow portion 54 which adjoins the wide portion 53 on a side closer to the covering wall 41 and has the width HW3 in the direction DV2 (i.e. in the direction in which the hooks 20 line up) equal to the width FW1 of the hook 20 inserted into the joint hole 52. The narrow portion 54 constitutes the position-limiting region 64.

In the illustrated embodiment, when, in assembling of the airbag cover 40 and case 12, the joint wall 45 of the airbag cover 40 is pushed towards the base wall 13 of the case 12 such that the hooks 20 slide on the inner surfaces 46a of the first opposing walls (namely, cover-side opposing walls) 46F and 46B until reaching and being inserted into the joint holes 49 and 52, with respect to the hook 20 to be inserted into the stopper joint hole 52, the leading end or pawl section 20b of the hook 20 firstly goes into the wide portion 53 and then the rising section 20a is fitted in the narrow portion 54, as shown in FIGS. 14 and 15. That is, with the above configuration, the hook 20 is easily fitted in the stopper joint hole 52 and is brought into engagement with the position-limiting region 64 merely by placing the cover-side opposing walls 46 (46F, 46B) over the first opposing walls (namely, case-side opposing walls) 15 (15F, 15B) and moving the airbag cover 40 toward the base wall 13 of the case 12.

Figure 16:
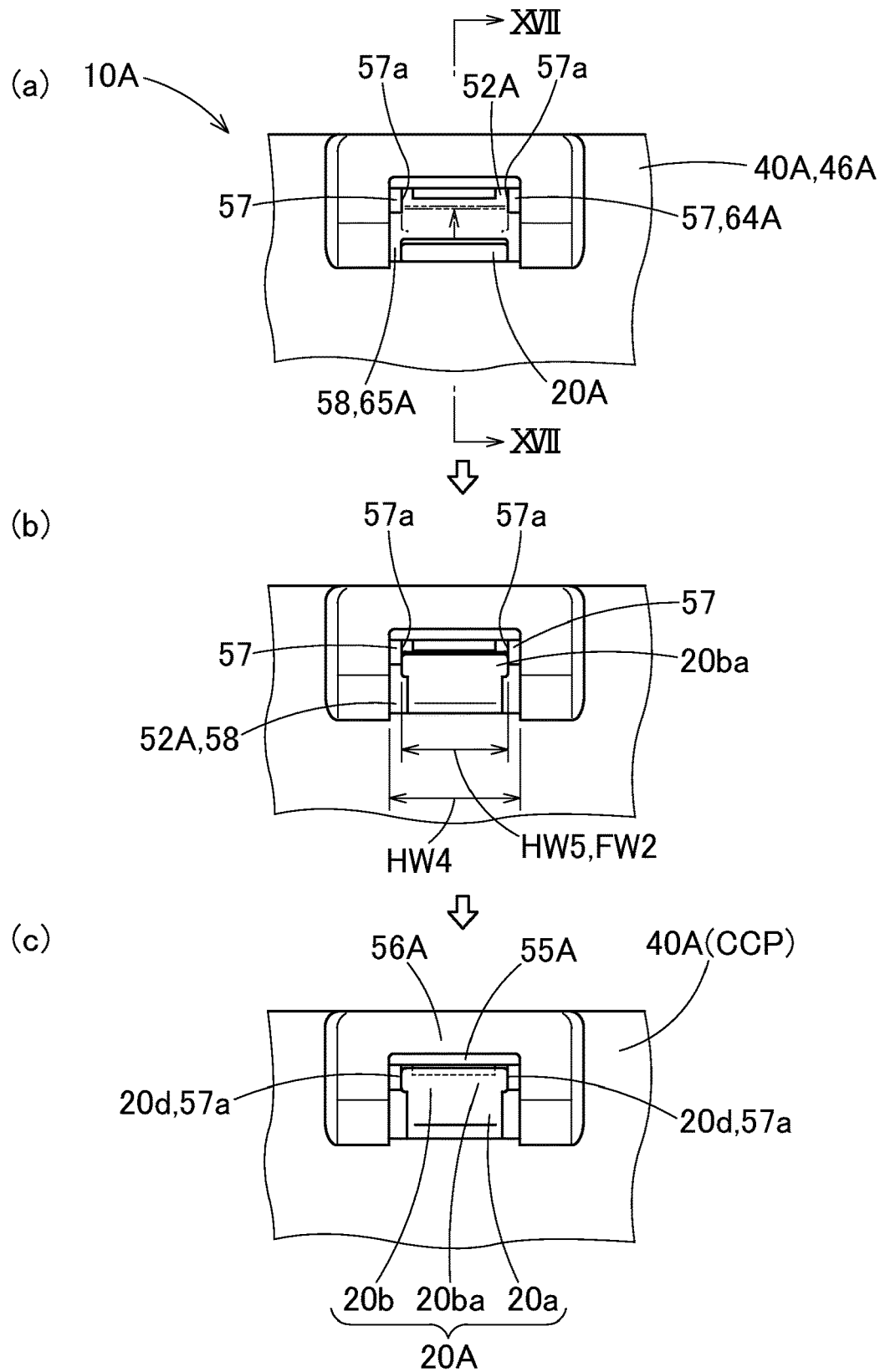
FIG. 16 illustrates the way a hook is inserted into a stopper joint hole of an airbag cover in an alternative embodiment.
Figure 17:
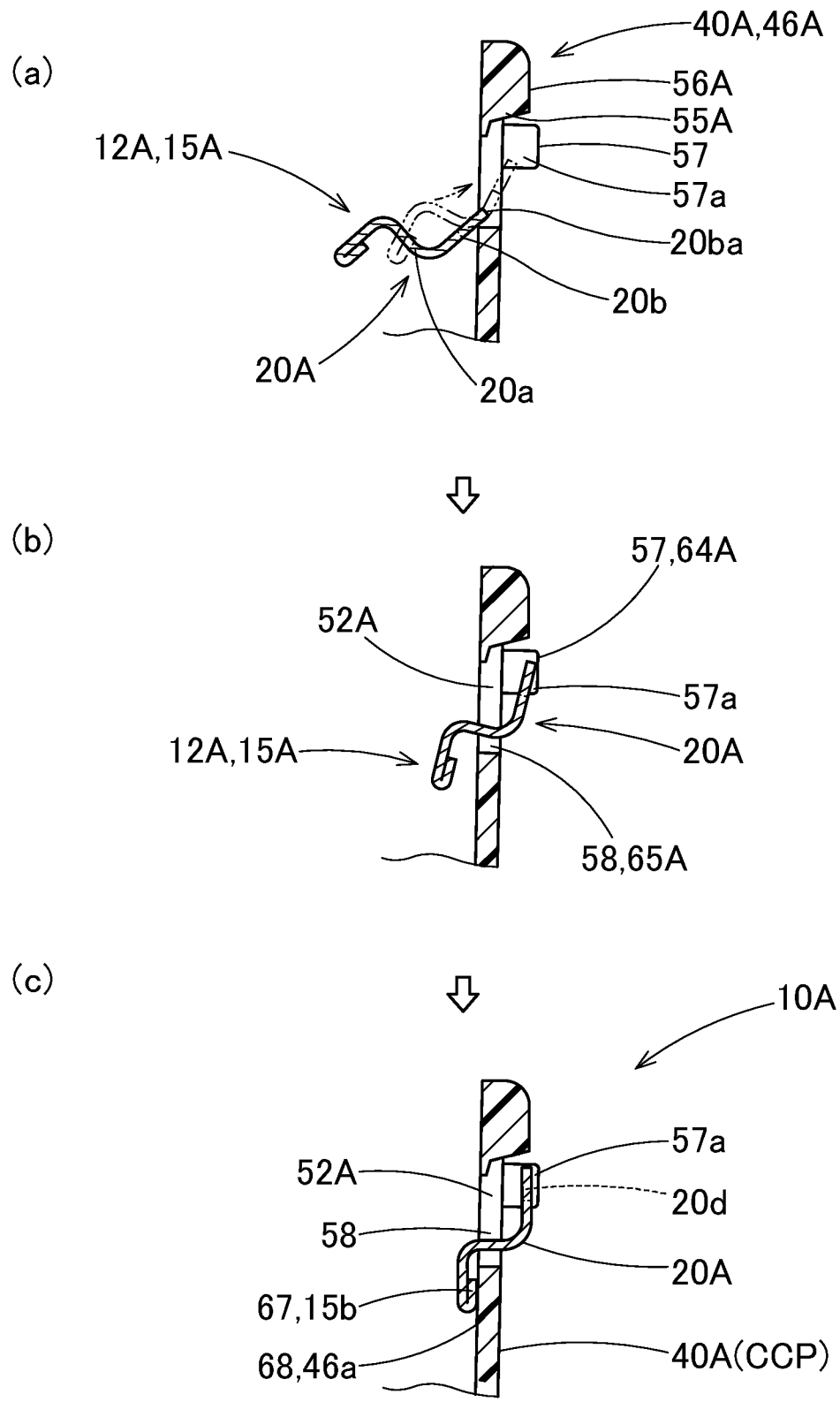
FIG. 17 shows sectional views taken along line XVII-XVII of FIG. 16.

If such an advantageous effect does not have to be considered, the hook of the case, the position-limiting region and the insertion-permitting region may alternatively be configured as those in an airbag device 10A illustrated in FIGS. 16 and 17. In the airbag device 10A, a hook 20A of a case 12A has a pawl section 20a whose leading end 20ba has a great width in the left and right direction. A stopper joint hole 52A of an airbag cover 40A includes an engagement region 55A which is engageable with the hook 20A, a pair of arresting regions 57 which are disposed on both sides of a vicinity of the engagement region 55A and hold both sides 20d of the leading end 20ba of the hook 20A with arresting planes 57a, and a wide portion 58 which is disposed in a lower portion of the joint hole 52A apart from the arresting regions 57 and serves as an insertion-permitting region 65A. The arresting planes 57a of the arresting regions 57 serve as a position-limiting region 64A. The wide portion 58 has a greater width HW4 than a width HW5 of a space between the arresting planes 57a of the arresting regions 57.

In the airbag device 10A configured as described above, as can be seen in FIGS. 16 and 17, an assembling work of a joint wall 45A of the airbag cover 40A and a tubular wall 14A of the case 12 is conducted by tipping the hook 20A so that the leading end 20ba goes through the wide portion 58 from inside to outside, restoring the inclination of the hook 20A, fitting the hook 20A between the arresting regions 57 such that the sides 20d of the hook 20A abut against the arresting planes 57a and the rising section 20a of the hook 20A is disposed in the wide portion 58.

In the airbag device 10A of the alternative embodiment, once the airbag cover 40A is assembled with the case 12A, the arresting planes 57a of the arresting regions 57 (i.e. the position-limiting region 64A) abut against the left and right sides 20d of the leading end 20ba of the hook 20A and prevent the airbag cover 40A from slipping in the direction DV2 in which the hooks 20A line up. Further, although the position-limiting region 64A is configured to arrest the hook 20A on the left and right sides 20d, the hook 20A firstly goes through the wide portion 58 (i.e. the insertion-permitting region 65A) with the greater width HW4 before brought into engagement with the position-limiting region 64A. That is, an engagement work of the hook 20A and the stopper joint hole 52A provided with the position-limiting region 64A and insertion-permitting region 65A does not complicate the assembling of the airbag cover 40 and the case 12.

In the airbag device 10 of the illustrated embodiment, the position-limiting region 64 and the insertion-permitting region 65 are disposed in both of the cover-side opposing walls 46F and 46B of the joint wall 45 of the airbag cover 40.

With this configuration, since both of the cover-side opposing walls 46F and 46B are each provided with the position-limiting region 64 and the insertion-permitting region 65, the position-limiting regions 64 help hold the door 42 (42F, 42B) and the tearable region 43 of the airbag cover 40 in position in both front and rear sides 42c and 42d (FIGS. 5 and 8), such that the tearable region 43 will break smoothly and the door 42 will open steadily.

Figure 6:
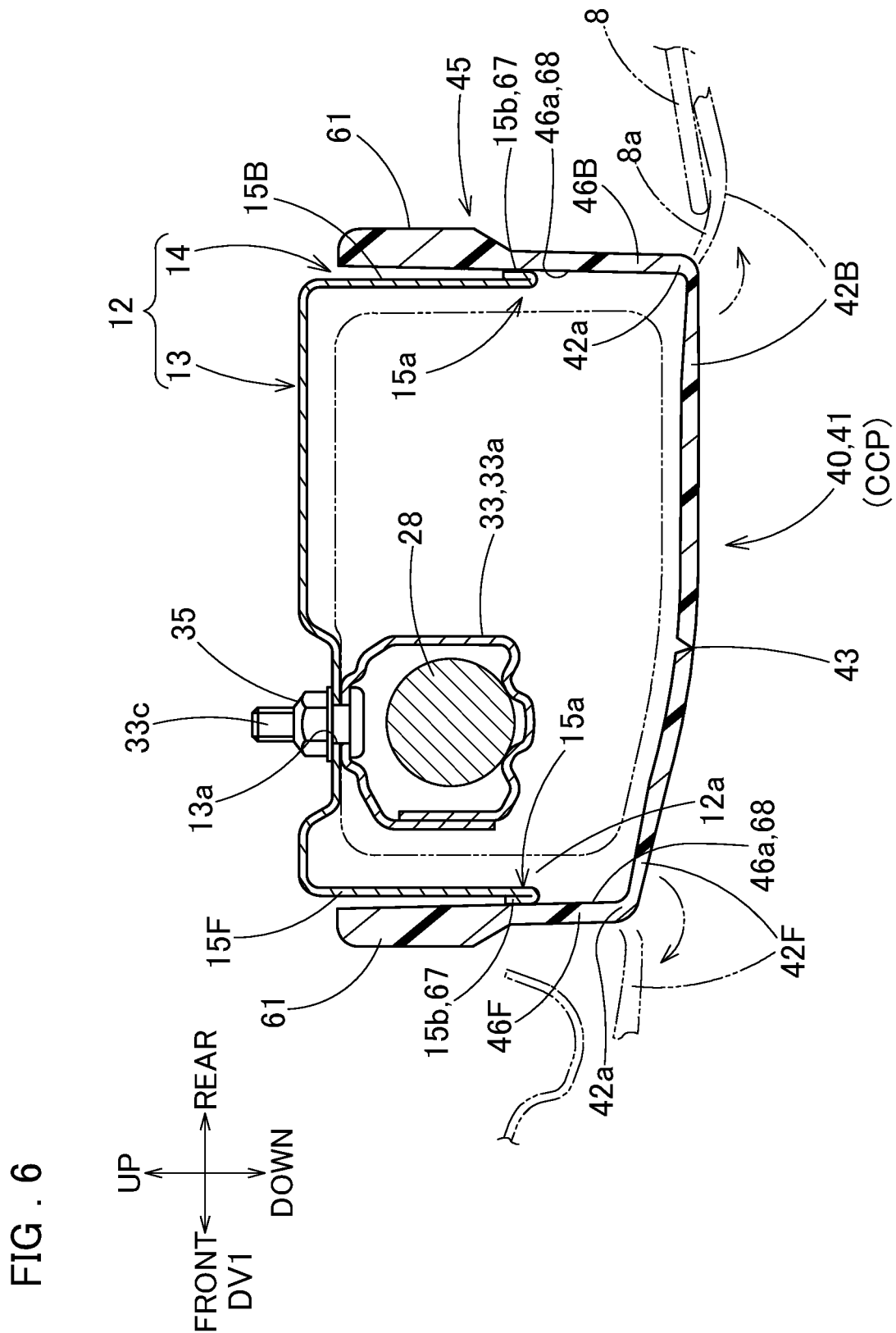
FIG. 6 is a schematic sectional view taken along line VI-VI of FIG. 2.

Moreover, as can be seen in FIGS. 5 and 6, each of the cover-side opposing walls 46F and 46B includes an abutment region (cover-side abutment region) 68 while each of the case-side opposing walls 15F and 15B includes an abutment region (case-side abutment region) 67 that is in abutment with the cover-side abutment region 68. The abutment regions 68 of the cover-side opposing walls 46 and the abutment regions 67 of the case-side opposing walls 15 prevent, in combination, a slipping movement of the airbag cover 40 with respect to the case 12 in the direction DV1 that the cover-side opposing walls 46 are opposed to each other (i.e. in the front and rear direction). In the illustrated embodiment, the abutment region 67 on the part of the case 12 is composed of the thick region 15b which is disposed at the leading end of each of the case-side opposing walls 15F and 15B. The abutment region 68 on the part of the airbag cover 40 is composed of the inner surfaces 46a of the cover-side opposing wall 46F and 46B. Once the airbag cover 40 and the case 12 are coupled, the thick regions 15b of the case 12 abut against the inner surfaces 46a of the cover-side opposing wall 46F and 46B of the airbag cover 40.

With this configuration, the contact between the abutment region 67 of the case 12 and abutment region 68 of the airbag cover 40 prevents the door 42 (42F, 42B) from being dislocated in the direction DV1 that the cover-side opposing walls 46 are opposed to each other (i.e. in the front and rear direction), that is, in the direction that the case-side opposing walls 15 are opposed to each other or in a direction orthogonal to the direction DV2 in which the hooks 20 line up. That is, the door 42 (42F, 42B) is prevented from being dislocated with respect to the case 12 both in the front and rear direction and left-right direction (i.e. both in the direction DV2 in which the hooks 20 line up and in the direction DV1 orthogonal to the direction DV2) by the position-limiting region 64 and the contact between the corresponding abutment regions 67 and 68. Accordingly, the door 42 is kept in place further adequately and is able to open smoothly when pushed by the airbag, such that the airbag 11 will be deployed in a steady fashion.

In the airbag device 10 of the illustrated embodiment, moreover, the door 42 (42F, 42B) of the airbag cover 40 is configured to rotate in a direction that the cover-side opposing walls 46 (46F, 46B) are opposed to each other (i.e. in the front and rear direction) when opening.

In other words, each of the hinge sections 42a of the door 42 about which the door 42 opens are disposed close to the cover-side opposing walls 46 (46F, 46B) which are each provided with the joint holes 49 and 52. With this configuration, even if the door 42 (42F, 42B) opens around the hinge sections 42a with a great rotational moment following a breakage of the tearable region 43 and pulls the joint wall 45 of the airbag cover 40 forcefully, the hooks 20 as engaged with the joint holes 49 and 52 hold the joint wall 45 adequately, thus help open the door 42 in a steady fashion.

Furthermore, although the door 42 of the airbag cover 40 of the illustrated embodiment is the double door 42F, 42B that open towards both of the cover-side opposing walls 46F and 46B, the door may alternatively be a single door.

In the illustrated embodiment, one each stopper joint hole 52 (i.e. the joint hole provided with the position-limiting region 64 and insertion-permitting region 65) is disposed in each of the cover-side opposing walls 46F and 46B. However, it is also conceivable to locate one or more stopper joint holes provided with the position-limiting region 64 and insertion-permitting region 65 in only either one of the cover-side opposing walls 46F and 46B. It is further conceivable to locate more than one stopper joint hole on both of the cover-side opposing walls 46F and 46B.

Although the airbag device 10 of the foregoing embodiments has been described as is adapted for protection of knees of a passenger, the application of the invention should not be limited thereby. The invention may be applied to any airbag devices in which a case and an airbag cover are coupled together by insertion of hooks of the case into joint holes of the airbag cover. By way of example, the invention may also be applied to an airbag device for protecting an upper body of a passenger.

What is claimed is:

1. An airbag device adapted to be mounted on a vehicle, comprising:
    an airbag which is folded up;
    a case for storing the airbag, the case being made from metal and including a base wall, a tubular wall that extends from an outer circumferential edge of the base wall, an emergence opening that is enclosed by the tubular wall for allowing the airbag to be deployed there through, and a plurality of hooks disposed on the tubular wall, each of the hooks being formed into such a hook shape that rises outwardly from a position of the tubular wall apart from the base wall and extends towards the base wall;
    an airbag cover that is made from synthetic resin and coupled with the case, the airbag cover including a covering wall that covers the emergence opening of the case, a door that is formed on the covering wall and openable when pushed by the airbag as inflated, a joint wall that extends from a periphery of the door on a backside of the covering wall, a plurality of joint holes that are formed through the joint wall for receiving the hooks of the case such that the joint wall of the airbag cover is coupled with the tubular wall of the case;
    an approximation-limiting region that suppresses the covering wall of the airbag cover as coupled with the case from moving further towards a direction approximating the base wall of the case, the approximation-limiting region including at least one abutment region which is disposed in either one of the case and the airbag cover and a corresponding number of receiving region which is disposed in the other of the case and the airbag cover and abuts against the abutment region; and
    a separation-limiting region that suppresses the covering wall of the airbag cover as coupled with the case from moving further towards a direction drawing away from the base wall of the case, the separation-limiting region includes at least one retaining hole which is formed in either one of the tubular wall of the case or the joint wall of the airbag cover and a corresponding number of retaining projection which is formed in the other of the tubular wall of the case or the joint wall of the airbag cover and inserted into the retaining hole for engagement with an oncoming portion of an inner surface of the retaining hole when the airbag cover moves towards the direction drawing away from the base wall, wherein:

the tubular wall of the case is formed into a generally square tubular contour including a pair of first opposing walls that are opposed to each other in a first direction and a pair of second opposing walls that are opposed to each other in a second direction which is orthogonal to the first direction;

the joint wall of the airbag cover is formed into a generally square tubular contour including a pair of first opposing walls that are opposed to each other in the first direction and a pair of second opposing walls that are opposed to each other in the second direction;

the approximation-limiting region is disposed on both sides of the emergence opening in or in a vicinity of either one of the first opposing walls and the second opposing walls of the case and in or in a vicinity of corresponding opposing walls of the airbag cover; and the separation-limiting region is disposed on both sides of the emergence opening in the other of the first opposing walls and the second opposing walls of the case and in corresponding opposing walls of the airbag cover.

2. The airbag device of claim 1, wherein:

the abutment region of the approximation-limiting region is composed of a leading end region of each of the opposing walls of the joint wall of the airbag cover;

the receiving region of the approximation-limiting region is disposed in the case; and the opposing walls of the joint wall of the airbag cover having the abutment regions of the approximation-limiting region are disposed outside of corresponding opposing walls of the tubular wall of the case.

3. The airbag device of claim 1, wherein:

the retaining projection of the separation-limiting region protrudes outwardly from each of the opposing walls of the tubular wall of the case and inserted into the retaining hole disposed in each of corresponding opposing walls of the joint wall of the airbag cover; and the opposing walls of the joint wall of the airbag cover having the retaining holes are disposed outside of the opposing walls of the tubular wall of the case having the retaining projections.

4. The airbag device of claim 3, wherein:

the joint wall of the airbag cover has a generally rectangular annular cross-sectional contour having opposite long sides and opposite short sides; and the retaining hole is disposed in each of the opposing walls constituting the long sides and receives therein the retaining projection which is disposed in each of corresponding opposing walls of the case.

5. The airbag device of claim 4, wherein:

the joint holes are disposed in the opposing walls of the airbag cover that have the retaining holes;

the hooks are disposed in the opposing walls of the case that have the retaining projections;

the retaining hole is disposed between two of the joint holes in each of the opposing walls of the airbag cover; and a protruding amount from the opposing wall of the retaining projection is smaller than that of each of the hooks.

6. An airbag device adapted to be mounted on a vehicle, comprising:

an airbag which is folded up;

a case for storing the airbag, the case being made from metal and including a base wall, a tubular wall that extends from an outer circumferential edge of the base wall and that includes a pair of case-side opposing walls, an emergence opening that is enclosed by the tubular wall for allowing the airbag to be deployed there through, and a plurality of hooks which are disposed in each of the case-side opposing walls, each of the hooks being formed into such a hook shape that rises outwardly from a position of each of the case-side opposing walls apart from the base wall and extends towards the base wall;

an airbag cover that is made from synthetic resin and coupled with the case, the airbag cover including a covering wall that covers the emergence opening of the case, a tearable region that is formed on the covering wall and tearable when pushed by the airbag as inflated, a door that is formed in an area surrounded by the tearable region on the covering wall and openable when the tearable region tears, a joint wall that extends from a periphery of the door on a backside of the covering wall and that includes a pair of cover-side opposing walls each of which overlap with each of the case-side opposing walls, a plurality of joint holes that are formed through each of the cover-side opposing walls for receiving the hooks of the case such that each of the cover-side opposing walls is coupled with each of the case-side opposing walls;

a position-limiting region that is disposed in or in a vicinity of an inner surface of at least one of the joint holes in at least one of the cover-side opposing walls of the airbag cover and that is in engagement with a corresponding one of the hooks in order to prevent a slipping movement of the hooks as inserted in the joint holes in a direction in which the hooks line up; and an insertion-permitting region that is disposed adjacent the position-limiting region and permits an insertion of the corresponding one of the hooks into the joint hole before the hook is brought into engagement with the position-limiting region, wherein the joint hole provided with the position-limiting region and the insertion-permitting region includes:

a wide portion that is greater in width in the direction in which the hooks line up than each of the hooks and constitutes the insertion-permitting region; and a narrow portion that adjoins the wide portion on a side closer to the covering wall and has an equal width in the direction in which the hooks line up to that of each of the hooks, the narrow portion constituting the position-limiting region.

7. The airbag device of claim 6, wherein the position-limiting region and the insertion-permitting region are disposed in both of the cover-side opposing walls of the joint wall of the airbag cover.

8. The airbag device of claim 7, wherein:

each of the cover-side opposing walls includes a cover-side abutment region; and each of the case-side opposing walls includes a case-side abutment region that is in abutment with the cover-side abutment region; and the cover-side abutment regions and the case-side abutment regions prevent, in combination, a slipping movement of the airbag cover with respect to the case in a direction that the cover-side opposing walls are opposed to each other.

9. The airbag device of claim 6, wherein the door of the airbag cover is configured to rotate in a direction that the cover-side opposing walls are opposed to each other when opening.

10. The airbag device of claim 9, wherein the door of the airbag cover is composed of a double door that open towards both of the cover-side opposing walls.

* * * * *